(12) United States Patent
Hane

(10) Patent No.: US 12,471,752 B2
(45) Date of Patent: Nov. 18, 2025

(54) ENDOSCOPE SYSTEM, METHOD OF SCANNING LUMEN USING ENDOSCOPE SYSTEM, AND ENDOSCOPE

(71) Applicant: OLYMPUS CORPORATION, Tokyo (JP)

(72) Inventor: Jun Hane, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 508 days.

(21) Appl. No.: 17/896,227

(22) Filed: Aug. 26, 2022

(65) Prior Publication Data
US 2022/0400931 A1 Dec. 22, 2022

Related U.S. Application Data

(63) Continuation of application No. PCT/JP2020/007976, filed on Feb. 27, 2020.

(51) Int. Cl.
*A61B 1/00* (2006.01)
*A61B 1/05* (2006.01)

(52) U.S. Cl.
CPC ...... *A61B 1/00009* (2013.01); *A61B 1/00096* (2013.01); *A61B 1/05* (2013.01)

(58) Field of Classification Search
CPC .... A61B 1/00009; A61B 1/00096; A61B 1/05
(Continued)

(56) References Cited

U.S. PATENT DOCUMENTS

2005/0154262 A1* 7/2005 Banik .............. A61B 1/128
600/179
2012/0289783 A1 11/2012 Duindam et al.
(Continued)

FOREIGN PATENT DOCUMENTS

JP 2009297415 A 12/2009
JP 2017164555 A 9/2017
(Continued)

OTHER PUBLICATIONS

International Search Report dated May 12, 2020 issued in PCT/JP2020/007976.
(Continued)

*Primary Examiner* — Anh Tuan T Nguyen
*Assistant Examiner* — James Edward Boice
(74) *Attorney, Agent, or Firm* — Scully, Scott, Murphy & Presser, P.C.

(57) ABSTRACT

An endoscope system includes: an insertion body inserted into a lumen; an objective optical system that is provided in the insertion body and acquires light from a subject as subject light; an image sensor that performs imaging based on the subject light to acquire a captured image within a field of view; a turning mechanism that causes a distal end of the insertion body to rotate around a reference axis that is an axis of the insertion body; an advancing/retreating mechanism that moves the insertion body in a direction corresponding to the reference axis; and a processor that includes hardware and is configured to control the turning mechanism and the advancing/retreating mechanism to control the field of view of the image sensor. The processor controls the turning mechanism and the advancing/retreating mechanism to perform scan of an inner wall of the lumen based on the field of view.

17 Claims, 19 Drawing Sheets

(58) Field of Classification Search
USPC .......................... 600/109; 604/264; 606/130
See application file for complete search history.

(56) References Cited

U.S. PATENT DOCUMENTS

| | | | |
|---|---|---|---|
| 2015/0313445 A1* | 11/2015 | Davidson | A61B 1/31 600/109 |
| 2018/0007322 A1 | 1/2018 | Kojo | |
| 2018/0014773 A1* | 1/2018 | Barton | A61B 5/0066 |
| 2020/0387706 A1* | 12/2020 | Zur | G06T 7/0012 |
| 2021/0196398 A1* | 7/2021 | Ye | A61B 5/0084 |
| 2021/0282624 A1* | 9/2021 | Nichols | A61B 1/0057 |

FOREIGN PATENT DOCUMENTS

| | | | |
|---|---|---|---|
| JP | 2017225700 A | 12/2017 | |
| JP | 6578619 B1 | 9/2019 | |
| WO | 2018003606 A1 | 1/2018 | |
| WO | 2019123986 A1 | 6/2019 | |

OTHER PUBLICATIONS

Armin, Mohammad Ali et al., "Automated Visibility Map Of The Internal Colon Surface from Colonoscopy Video", International Journal of Computer Assisted Radiology and Surgery (2016), vol. 11, Issue No. 9, pp. 1599-1610.

* cited by examiner

ENDOSCOPE SYSTEM, METHOD OF SCANNING LUMEN USING ENDOSCOPE SYSTEM, AND ENDOSCOPE

CROSS REFERENCE TO RELATED APPLICATION

This application is a continuation of International Patent Application No. PCT/JP2020/007976, having an international filing date of Feb. 27, 2020, which designated the United States, the entirety of which is incorporated herein by reference.

BACKGROUND

Endoscopes have been widely used in the medical and industrial fields. For example, in the medical field, a physician can perform endoscopy or other procedures as he/she inserts an insertion section of an endoscope into a subject and observes the inside of the subject by viewing captured images displayed on a display device.

For example, if a physician performs a colonoscopy by manually operating a colonoscope, uneven scanning of the large intestinal lumen may occur. This may lead to missing lesions. Japanese Unexamined Patent Application Publication No. 2017-164555 discloses a method of automatically navigating motion of a distal end section of a medical device by controlling an actuator when inserting the medical device.

In addition, a method of building a three-dimensional model of the intestinal tract based on a video captured by an endoscope has been studied for the purpose of, for example, identifying areas left unobserved by a colonoscope. For example, Mohammad Ali Armin et al., "Automated visibility map of the internal colon surface from colonoscopy video" disclose a method of generating a map of the surface of the large intestine using a cylinder model.

SUMMARY

In accordance with one of some aspect, there is provided an endoscope system comprising: an insertion body to be inserted into a lumen; an objective optical system that is provided in the insertion body and acquires light from a subject as subject light; an image sensor that performs imaging based on the subject light to acquire a captured image within a field of view; a turning mechanism that causes a distal end of the insertion body having the objective optical system to rotate around a reference axis, the reference axis being an axis of the insertion body; an advancing/retreating mechanism that moves the insertion body in a direction corresponding to the reference axis; and a processor that includes hardware and is configured to control the turning mechanism and the advancing/retreating mechanism to control the field of view of the image sensor, wherein the processor controls the turning mechanism and the advancing/retreating mechanism to perform scan of an inner wall of the lumen based on the field of view.

In accordance with one of some aspect, there is provided a method of scanning a lumen using an endoscope system, the method comprising: inserting an insertion body of an endoscope system into a lumen, the endoscope system including: the insertion body; an objective optical system that is provided in the insertion body and acquires light from a subject as subject light; and an image sensor that performs imaging based on the subject light to acquire a captured image within a field of view; and performing a turning operation and an advancing/retreating operation to scan an inner wall of the lumen by the field of view, the turning operation causing a distal end of the insertion body having the objective optical system to rotate around a reference axis, the reference axis being an axis of the insertion body, the advancing/retreating operation causing the insertion body to move in a direction corresponding to the reference axis.

In accordance with one of some aspect, there is provided an endoscope comprising: an insertion body to be inserted into a lumen; an objective optical system that is provided in the insertion body and acquires light from a subject as subject light; an image sensor that performs imaging based on the subject light to acquire a captured image within a field of view; a turning mechanism that causes a distal end of the insertion body having the objective optical system to rotate around a reference axis, the reference axis being an axis of the insertion body; and an advancing/retreating mechanism that moves the insertion body in a direction corresponding to the reference axis.

DESCRIPTION OF EXEMPLARY EMBODIMENTS

Figure 1:
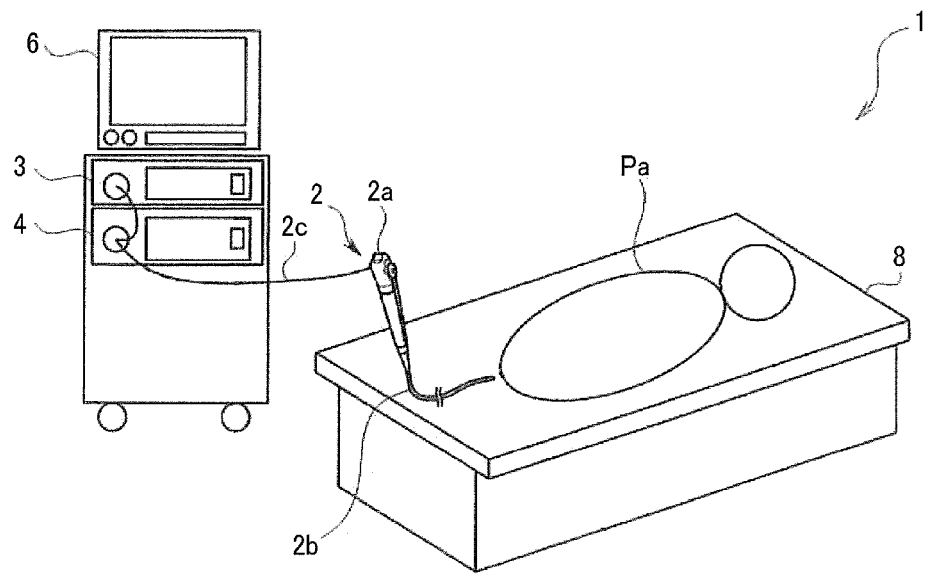
FIG. 1 illustrates an example configuration of an endoscope system.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

Exemplary embodiments are described below. Note that the following exemplary embodiments do not in any way limit the scope of the content defined by the claims laid out herein. Note also that all of the elements described in the present embodiment should not necessarily be taken as essential elements.

1. Example System Configuration

In inspections using an endoscope system, it is important to reduce missed regions of interest. The region of interest refers to a region that has a relatively higher observation priority than other regions for a user. If the user is a physician who performs diagnosis and treatment, the region of interest corresponds to, for example, a region including a lesion site as described above. However, if the object that the physician wants to observe is bubbles or residue, the region of interest may be a region including the bubble or residue portion. In other words, an object that should be noted by the user depends on the purpose of an observation, and a region with a relatively higher observation priority than other regions for the user during the observation is the region of interest.

An example is described below where the endoscope system is an in-vivo observation system and the object for observation is the large intestine. That is, the lumen described below in the present embodiment is, in a narrow sense, the intestinal tract. However, the technique of the present embodiment may be applied to lumens other than the intestinal tract. For example, the technique may be applied to digestive tracts other than the large intestine, or luminal structures in other parts of a living body. The endoscope system may also be an industrial endoscope used for observation of luminal components. In the example discussed below, the region of interest is a lesion, but the region of interest can extend beyond the lesion, as described above.

In order to reduce missed lesions, it is important to capture an entire surface of a luminal structure, such as the intestinal tract, without missing any part thereof. However, it has been difficult to have an accurate picture of how the endoscope is being moved in which portion of the luminal structure and which area of the luminal structure under what imaging conditions is being imaged by that movement. In addition, in cases where a physician manually operates the endoscope, the physician needs to operate the endoscope and perform diagnosis or other procedures based on captured images at the same time. Accordingly, for example if the physician concentrates on diagnosis, he/she may be unable to operate the endoscope accurately, which may result in uneven scanning of the large intestinal lumen. Meanwhile, if the physician concentrates on the operation of the endoscope, he/she may be unable to fully view the captured images and may miss a lesion despite it being shown in the images.

Thus, the technique of the present embodiment, which employs a configuration in which motion of the field of view of an imaging section is controlled by control of a turning mechanism 18 and an advancing/retreating mechanism 17 of an endoscope system 1, provides control such that an inner wall of the lumen is scanned by the field of view.

The field of view of the imaging section as referred to herein represents a given space determined by a direction of the optical axis of the imaging section and an angle of view thereof. For example, the field of view of the imaging section is a space of a pyramidal or conical shape with a position corresponding to an image sensor 15 being the vertex and with the optical axis of the imaging section passing through the vertex and the center of the base. Directing the optical axis of the imaging section in the direction in which the lesion is or in a direction close to that direction makes it possible to capture the lesion in the field of view. For example, in the case of a configuration described below in which a subject light acquisition section 20 acquires subject light and the imaging section outputs a captured image by receiving the subject light, a subject captured in the field of view changes according to changes in relative positional relationship between the subject light acquisition section 20 and respective subjects.

The scanning in the present embodiment represents operation of moving the above field of view according to a predetermined rule to sequentially image a predetermined range of the inner surface of the lumen. The predetermined area as referred to herein is ideally the entire inner wall of the lumen.

The technique of the present embodiment controls the endoscope system such that the inner wall of the lumen is exhaustively imaged. This makes it possible to reduce missed lesions that may occur due to a part of the luminal structure being left unimaged, while reducing the burden on the physician to operate the endoscope. However, the technique of the present embodiment provides control that can reduce the probability of occurrence of missed lesions, and thus does not guarantee the complete prevention of occurrence of such missed lesions. In the present embodiment, it may be determined that there may be a missed lesion when there is a region of the luminal structure that is never in the field of view of the imaging section. Alternatively, as described below in the second embodiment, it may be determined that there may be a missed lesion when there is an unanalyzable portion that is not imaged in an analyzable state.

2. First Embodiment

2.1 Example System Configuration

FIG. 1 a configuration diagram illustrating the endoscope system 1 according to the present embodiment. The endoscope system 1 includes an endoscope 2, an image processing device 3, a light source device 4, and a monitor 6, which is a display device. A physician can perform the large intestine endoscopy to a patient Pa who is lying on his back on a bed 8 using the endoscope system 1. However, the endoscope system 1 is not limited to the configuration shown in FIG. 1, and various kinds of modifications can be made such as omitting some of these components or adding other components. For example, as described below, the endoscope system 1 may include such as a luminal structure detection device 5 or a magnetic field generating device 7.

Although FIG. 1 illustrates an example in which the image processing device 3 is provided near the endoscope 2, it is not limited thereto. For example, some or all of the functions of the image processing device 3 may be constructed by such as a server system that can be connected via a network. In other words, the image processing device 3 may be implemented by cloud computing. The network as referred to herein may be a private network such as an intranet or a public communication network such as the Internet. The network may also be wired connections or wireless.

Figure 2:
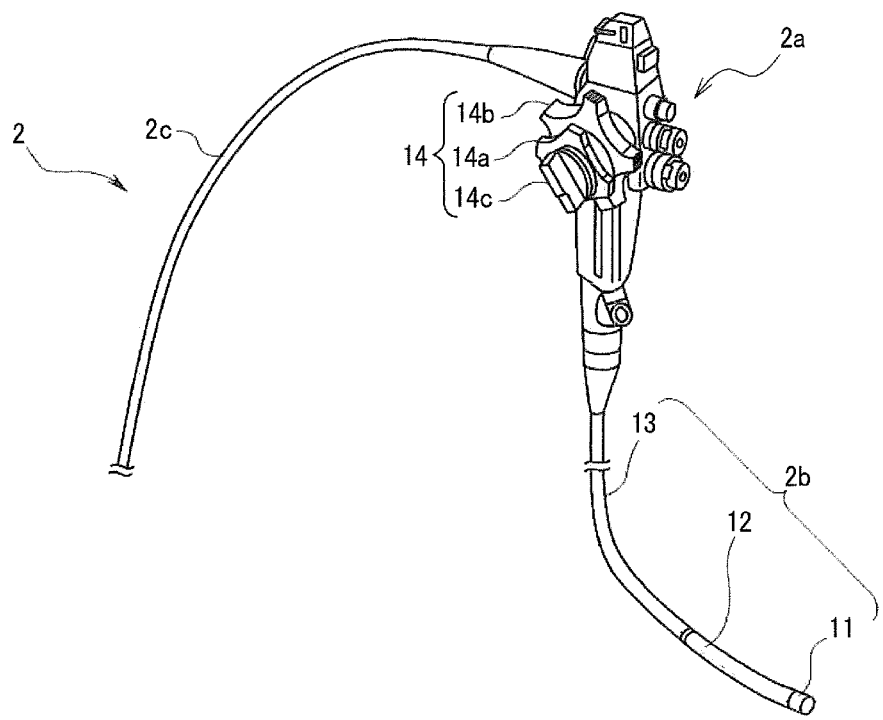
FIG. 2 illustrates an example configuration of an endoscope.

FIG. 2 is a perspective diagram of the endoscope 2. The endoscope 2 has an operation section 2a, a flexible insertion section 2b, a universal cable 2c including such as signal lines. The endoscope 2 is a tubular insertion device for which the tubular insertion section 2b is inserted into a body cavity. A connector is provided at the leading end of the universal cable 2c, and the endoscope 2 is detachably connected to the light source device 4 and the image processing device 3 by the connector. The endoscope 2 as referred to herein is an endoscope enabling to be inserted into the large intestine. Furthermore, although not shown, a light guide 22 is inserted into the universal cable 2c, and the endoscope 2 emits illumination light emitted from the light source device 4 from the leading end of the insertion section 2b through the light guide 22.

As shown in FIG. 2, the insertion section 2b has a distal end section 11, a curving section 12 allowing to curve, and a flexible tube 13 from the leading end to the base end of the insertion section 2b. The insertion section 2b is inserted into the lumen of the subject patient Pa. The base end portion of the distal end section 11 is connected to the leading end of the curving section 12, and the base end portion of the curving section 12 is connected to the leading end of the flexible tube 13. The distal end section 11 of the insertion section 2b is the distal end section of the endoscope 2, which is the hard rigid leading end.

The curving section 12 is allowed to curve in a desired direction depending on the operation to a curved operation member 14 provided in the operation section 2a. The curved operation member 14 includes, for example, a left/right curving operation knob 14a and an up/down curving operation knob 14b. When the curving section 12 is curved, the position and direction of the distal end section 11 is changed, and an observation part inside the subject is captured within a field of view, the illumination light is irradiated to the observation part. The curving section 12 has a plurality of curved pieces coupled along the longitudinal axis direction of the insertion section 2b. Thus, a physician can observe the large intestine of the patient Pa by curving the curving section 12 in various directions while pushing the insertion section 2b into the large intestine or pulling it out of the large intestine.

The left/right curving operation knob 14a and the up/down curving operation knob 14b cause an operation wire inserted into the insertion section 2b to pull and relax in order to curve the curving section 12. The curved operation member 14 further has a fixing knob 14c to fix the position of the curving section 12. Note that the operation section 2a is also provided with various operation buttons such as a release button or an air supply and water supply button in addition to the curved operation member 14.

The flexible tube 13 is flexible, and thus bends in response to external force. The flexible tube 13 is a tubular member extending from the operation section 2a.

The image sensor 15, which is an imaging device, is provided in the distal end section 11 of the insertion section 2b. The observation part in the large intestine illuminated by the illumination light of the light source device 4 is captured by the image sensor 15. That is, the image sensor 15 is provided in the distal end section 11 of the insertion section 2b and comprises of the imaging section for capturing inside the subject to acquire the captured images. The image signals obtained by the image sensor 15 are supplied to the image processing device 3 via the signal lines within the universal cable 2c. Note that the position provided with the image sensor 15 is not limited to the distal end section 11 of the insertion section 2b. For example, the light from the subject may be guided to provide with the image sensor 15 at the position on the base end side rather than the distal end section 11.

The image processing device 3 is a video processor to perform a predetermined image processing to the received image signals and to generate the captured images. The video signals of the generated captured images are output from the image processing device 3 to the monitor 6, and the live captured images are displayed on the monitor 6. A physician performing the examination can insert the distal end section 11 of the insertion section 2b through the anus of the patient Pa and observe inside the large intestine of the patient Pa.

The light source device 4 is a light source device enabling to emit normal light for a normal light observation mode. Note that in the case the endoscope system 1 also has a special light observation mode in addition to the normal light observation mode, the light source device 4 selectively emits normal light for the normal light observation mode and special light for the special light observation mode. The light source device 4 emits either normal light or special light as the illumination light depending on the state of a changeover switch for switching the observation mode provided in the image processing device 3.

Figure 3:
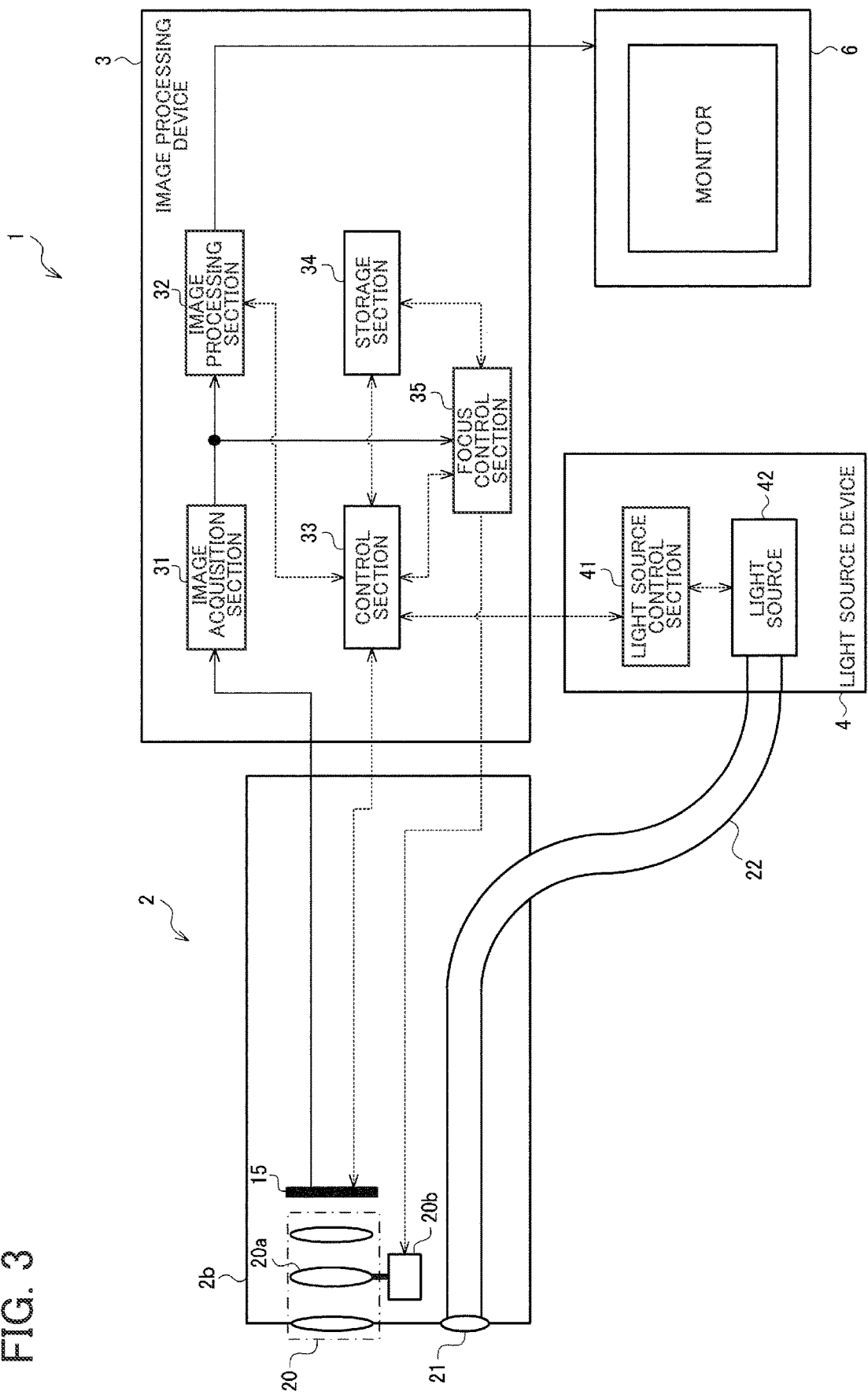
FIG. 3 illustrates an example configuration of each section of the endoscope system.

FIG. 3 is a schematic diagram illustrating a configuration of each section of the endoscope system 1 including the image processing device 3. The image processing device 3 performs the image processing and the overall system control. The image processing device 3 includes an image acquisition section 31, an image processing section 32, a control section 33, a storage section 34, and a focus control section 35. The Insertion section 2b includes the subject light acquisition section 20, the image sensor 15, an illumination lens 21, and the light guide 22. The subject light acquisition section 20 is specifically an objective optical system including one or more lenses. For example, the subject light acquisition section 20 includes a focus lens 20a, which is driven by an actuator 20b.

The light guide 22 guides the illumination light emitted from the light source device 4 to the leading end of the insertion section 2b. The illumination lens 21 irradiates the subject with the illumination light guided by the light guide 22. The subject light acquisition section 20 acquires the subject light, which is the reflected light reflected from the subject. The subject light acquisition section 20 includes the focus lens 20a, which may change a focus object-position depending on the position of the focus lens 20a. Actuator 20b drives the focus lens 20a based on an instruction from the focus control section 35. The focus object-position as referred to herein represents the position of the object when a system comprising a lens system, an image plane, and an object is in focus. For example, when the image plane is the plane of the image sensor, the focus object-position represents the position of the subject that is ideally in focus in the captured images when the image sensor is used to capture the subject images through the above lens system.

The image sensor 15, which is the imaging section, may be a monochrome sensor or a sensor with a color filter. The color filter may be a widely known Bayer filter, a complementary color filter, or any other filters. The complementary color filter is a filter including each color filter with cyan, magenta, and yellow.

The image processing device 3 in the present embodiment is configured by hardware as described below. The hardware can include at least one of the circuits processing the digital signals or the circuits processing the analog signals. For example, the hardware can be configured by one or more circuit devices implemented on a circuit substrate or one or more circuit elements. The one or more circuit devices are, for example, such as IC or field-programmable gate arrays (FPGA). The one or more circuit elements are, for example, such as a resistor or a capacitor.

The image processing device 3 may also be implemented by a processor as described below. The image processing device 3 in the present embodiment includes memory to store information and the processor to operate based on the information stored in the memory. The information is, for example, such as a program and various data. The processor includes the hardware. The processor can use various processors, such as a Central Processing Unit (CPU), a Graphics Processing Unit (GPU), a Digital Signal Processor (DSP). The memory may be semiconductor memory such as Static Random Access Memory (SRAM), Dynamic Random Access Memory (DRAM), or the register, or a magnetic memory device such as a Hard Disk drive (HDD), or an optical memory device such as an optical disk device. For example, the memory stores computer-readable instructions that the processor executes the instructions to cause the functions of each section of the image processing device 3 as processing to be implemented. Each section of the image processing device 3 is specifically referred as each section including the control section 33 shown in FIG. 3. The instructions as referred to herein may be a set of instructions configuring the program, or the instructions instructing the hardware circuit of the processor to operate.

Each section of the processing device 3 in the present embodiment may also be implemented as a module of the program operating on the processor. For example, the control section 33 is a control module for controlling each section of the endoscope system 1. Specifically, the control section 33 may be a control module for controlling the turning mechanism 18 or the advancing/retreating mechanism 17 as described below using such as FIGS. 4 to 7.

The program for implementing the processing performed by each section of the image processing device 3 in the present embodiment can be stored in an information storage device, which is, for example, a computer-readable medium. The information storage device can be implemented by, for example, such as an optical disk, a memory card, HDD, or semiconductor memory. The semiconductor memory is, for example, ROM. Such as the control section 33 of the image processing device 3 performs various processing in the present embodiment based on the program stored in the information storage device. That is, the information storage device stores the programs to make the computer function as each section of the image processing device 3. The computer is a device comprising an input device, a processing section, a storage part, and an output part. The program is a program for causing the computer to perform the processing of each section of the image processing device 3.

The image acquisition section 31 acquires the captured images output sequentially from the imaging section, and outputs the acquired captured images to the image processing section 32 and the focus control section 35 by the acquired images are output sequentially to the image processing section 32 and the focus control section 35. The image processing section 32 performs various image processing on the captured images, such as white balance processing, demosaicing (synchronization) processing, noise reduction processing, color conversion processing, tone conversion processing, and contour enhancement processing, and outputs them sequentially to the monitor 6. The control section 33 performs input and output of various control signals.

The focus control section 35 controls the focus lens 20a based on the captured images. The focus control section 35 controls the focus lens 20a based on, for example, the known contrast AF. For example, the focus control unit 35 controls the focus lens 20a based on the known contrast AF. However, AF is not an essential component of the endoscope system 1 in the present embodiment, and thus the focus control section 35 can be omitted.

The light source device 4 includes a light source control section 41 and a light source 42. The light source control section 41 controls the light intensity of the light source 42 in accordance with the target light intensity of the light source sequentially output from the control section 33. The Light source 42 emits the illumination light. The light source 42 may be a xenon light source, a light emitting diode (LED), or a laser light source. The light source 42 may also be other light sources, and thus the light emitting method is not limited.

2.2 Detailed Configuration Example of Insertion Section

Figure 4:
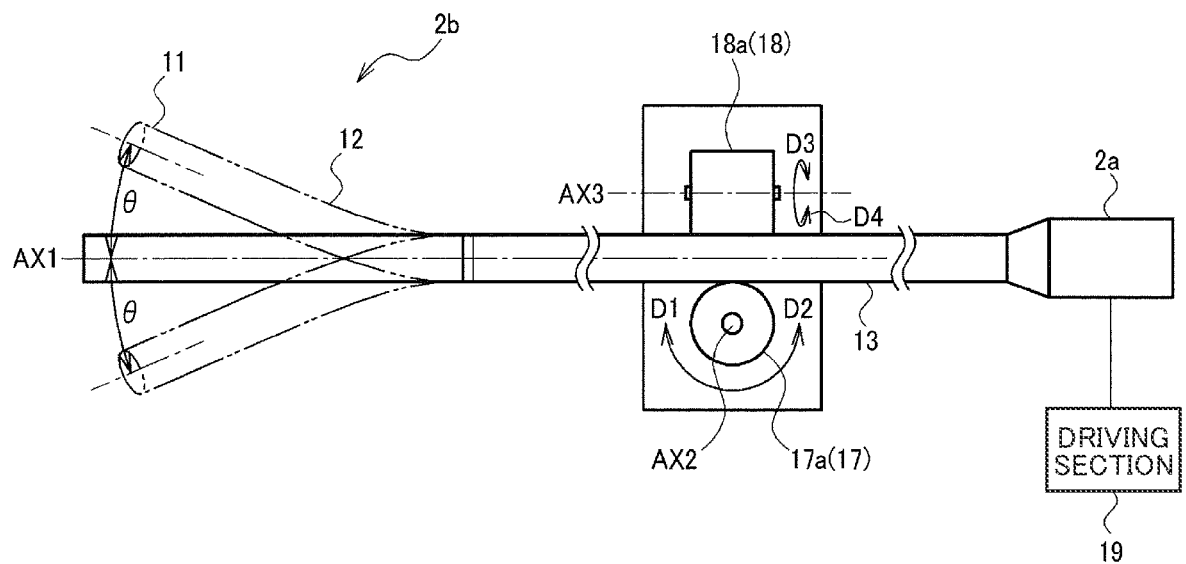
FIG. 4 illustrates an example configuration of an insertion section.

FIG. 4 is a schematic view illustrating a configuration example of the insertion section 2b. As illustrated in FIG. 4, the longitudinal direction of the insertion section 2b is used as a reference axis AX1. Note that, in a narrow sense, the reference axis AX1 is the longitudinal direction of the flexible tube 13. In a state in which the curving section 12 is not curved, the longitudinal direction of the curving section 12 substantially coincides with the reference axis AX1. In other words, performing the curving operation changes the longitudinal direction of the curving section 12 into a direction different from the reference axis AX1.

As illustrated in FIG. 4, the advancing/retreating mechanism 17 includes, for example, an advancing/retreating roller 17a that moves the insertion section 2b in a direction corresponding to the reference axis AX1, and a driving section 19 that drives the advancing/retreating roller 17a. The corresponding direction may be the same direction or substantially the same direction. Substantially the same direction is a direction in which an angle formed by the reference axis AX1 is equal to or less than a predetermined threshold value. The advancing/retreating roller 17a is rotatable in a direction indicated by D1 or D2 using AX2 as the rotational axis. A part of the advancing/retreating roller 17a is in contact with the insertion section 2b. Accordingly, the advancing/retreating roller 17a rotates in the direction of D1 and thereby the insertion section 2b moves in the proximal end direction. The proximal end direction mentioned here is a direction toward the base end side of the insertion section 2b, which corresponds to the anus side at the time of insertion. Furthermore, the advancing/retreating roller 17a rotates in the direction of D2 and thereby the insertion section 2b moves in the distal end direction. The distal end direction mentioned here is a direction in which the insertion section 2b is pushed into the distal end side, which corresponds to the cecum side at the time of insertion.

The turning mechanism 18 includes, for example, a rotating roller 18a that causes the insertion section 2b to rotate with the reference axis AX1 used as the rotational axis, and the driving section 19 that drives the rotating roller. Note that the driving section that drives the advancing/retreating roller 17a and the driving section that drives the rotating roller 18a may be provided separately. The rotating roller 18a is rotatable in a direction indicated by D3 or D4 using AX3 as the rotational axis. A part of the rotating roller 18a is in contact with the insertion section 2b. Accordingly, the rotating roller 18a rotates and thereby the insertion section 2b rotates in the reverse direction of the rotating roller 18a.

Furthermore, the curving section 12 can be curved with respect to the reference axis AX1 as illustrated in FIG. 4. Specifically, the curving angle of the curving section 12 with respect to the reference axis AX1 can be adjusted by an operation of at least either the up/down curving operation knob 14b or the left/right curving operation knob 14a. θ illustrated in FIG. 4 represents the curving angle.

Figure 5:
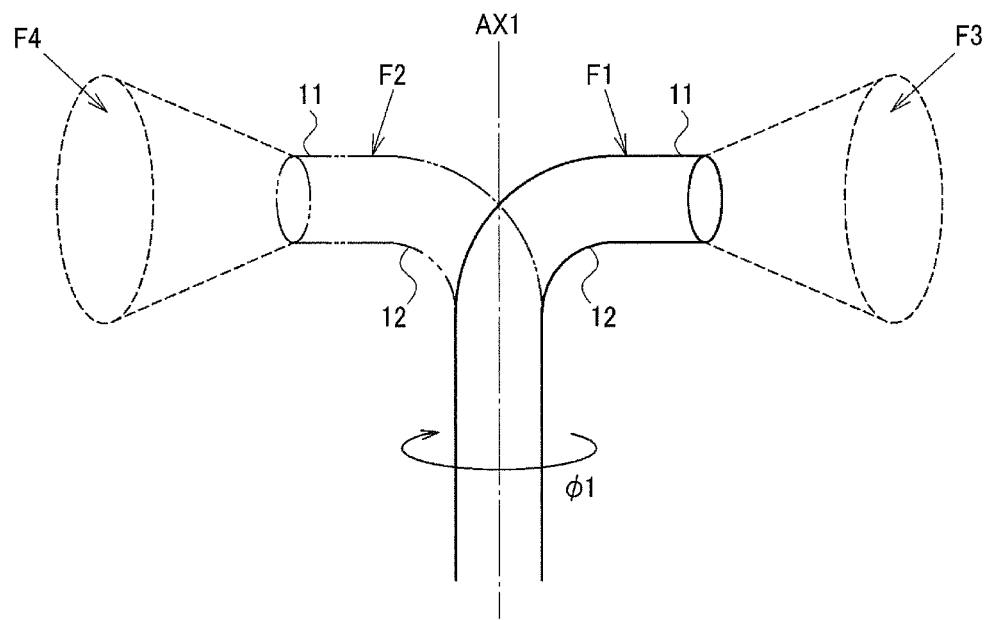
FIG. 5 illustrates rotation of a field of view of an imaging section caused by a turning mechanism.

FIG. 5 is a view illustrating a motion of the distal end section 11 when the rotating roller 18a is rotated in a state in which the curving section 12 is curved with respect to the reference axis AX1. F1 and F2 in FIG. 5 each represent the insertion section 2b in a state in which the curving section 12 is curved. F3 in FIG. 5 represents a field of view of the imaging section when the insertion section 2b is in a state of F1, and F4 in FIG. 5 represents a field of view of the imaging section when the insertion section 2b is in a state of F2.

F2 illustrated in FIG. 5 corresponds to a state in which the insertion section 2b is rotated by φ1 around the reference axis AX1 by the rotating roller 18a with the state of F1 used as the reference. The field of view of the imaging section also rotates by φ1 around the reference axis AX1 in association with the rotation of the insertion section 2b caused by the rotating roller 18a.

For example, the rotating roller 18a is rotated 360° in a state in which the curving section 12 is curved by a certain curving angle θ with respect to the reference axis AX1, so that an image of the lumen can be comprehensively captured in the circumferential direction. Furthermore, driving the advancing/retreating roller 17a enables to cause the field of view of the imaging section to move in the longitudinal direction of the lumen. That is, based on the control of the turning mechanism 18 and the advancing/retreating mechanism 17, the field of view can be controlled so as to scan the inner wall of the lumen. Specific scan will be described later with reference to FIGS. 9A to 11.

Figure 6:
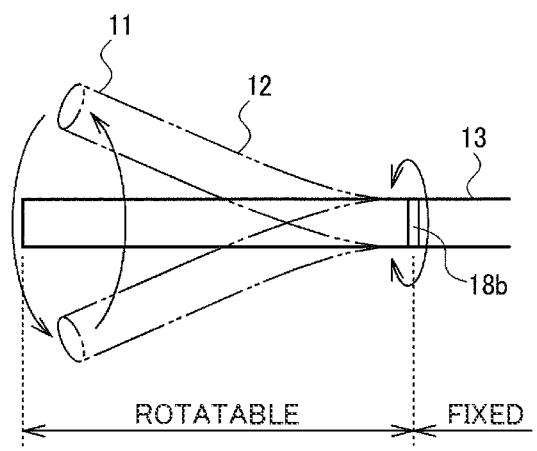
FIG. 6 illustrates another example configuration of the insertion section.

FIG. 6 is a schematic view illustrating another configuration of the insertion section 2b. The configuration in which the whole insertion section 2b is rotated around the reference axis AX1 by using the rotating roller 18a is illustrated in FIG. 4. In contrast, in the configuration illustrated in FIG. 6, the turning mechanism 18 has a rotating mechanism 18b, and the rotating mechanism 18b rotates only a part of the insertion section 2b which is close to the distal end section 11, around the reference axis AX1. In the example illustrated in FIG. 6, in the insertion section 2b, the distal end section 11 and the curving section 12 are rotatable around the reference axis AX1 by means of the rotating mechanism 18b, and the flexible tube 13 does not rotate around the reference axis AX1. However, various modifications can be implemented as to which portions of the insertion section 2b are made rotatable.

As illustrated in FIGS. 4 to 6, the turning mechanism 18 is, for example, a mechanism that causes at least a part of the insertion section 2b to rotate around the reference axis AX1 in a state in which the curving section 12 is curved with respect to the reference axis AX1, and the whole insertion section 2b may rotate or a part of the insertion section 2b on the distal end side may rotate.

Furthermore, it is sufficient that the turning mechanism 18 is able to rotate the field of view of the imaging section, which is not limited to the one that causes the insertion section 2b to rotate around the reference axis AX1. As described above, the curving section 12 has the up/down curving operation knob 14b and the left/right curving operation knob 14a, and the curving direction can be adjusted to four directions of upper, lower, left, and right, in addition to the curving angle θ with respect to the reference axis AX1. For example, when curving in the upper direction is used as the reference position, curving in the right or left direction corresponds to rotation by ±90 degrees around the reference axis AX1. The lower direction corresponds to rotation by ±180 degrees around the reference axis AX1. In addition, adjusting the curving degree in the up-down direction and the curving degree in the left-right direction can realize rotation between 0° and ±90° and between ±90° and ±180°.

That is, the turning mechanism 18 is a mechanism that drives the curving section 12, and the turning mechanism 18 may change the shape of the curving section 12 to cause the subject light acquisition section 20 to rotate around the reference axis AX1. For example, the turning mechanism 18 includes an unillustrated motor or the like that causes the left/right curving operation knob 14a and the up/down curving operation knob 14b to rotate. The control section 33 controls the motor to automatically operate the left/right curving operation knob 14a and the up/down curving operation knob 14b.

Figure 7:
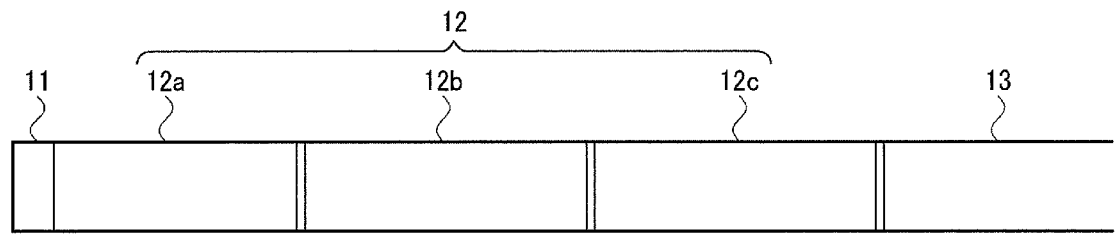
FIG. 7 illustrates another example configuration of the insertion section.

FIG. 7 is a schematic view illustrating another configuration of the curving section 12. As illustrated in FIG. 7, the curving section 12 may include two or more curving sections that can be controlled individually. In the example of FIG. 7, the curving section 12 includes a first curving section 12a, a second curving section 12b, and a third curving section 12c. The first curving section 12a to the third curving section 12c can be individually operated in the up-down direction and the left-right direction, for example. The curving section 12 is thus divided into a plurality of curving sections, so that the positional posture of the subject light acquisition section 20 with respect to the lumen can be controlled with high accuracy. For example, in the case where the turning mechanism 18 does not have the rotating roller 18a and the rotating mechanism 18b, dividing the curving section 12 into a plurality of curving sections makes it easier to finely control the gap amount of the rotation amount, for example.

Furthermore, the configuration illustrated in FIG. 7 may be combined with a configuration in which a part or the whole of the insertion section 2b is caused to rotate, e.g., the configuration illustrated in FIG. 4 in which the whole insertion section 2b is caused to rotate, or the configuration illustrated in FIG. 6 in which the distal end portion of the insertion section 2b is caused to rotate.

FIGS. 8A to 8D are schematic views each illustrating another configuration of the insertion section 2b. As illustrated in FIGS. 8A to 8D, the subject light acquisition section 20 may be able to receive subject light from the side surface of the insertion section 2*b*.

Figure 8A:
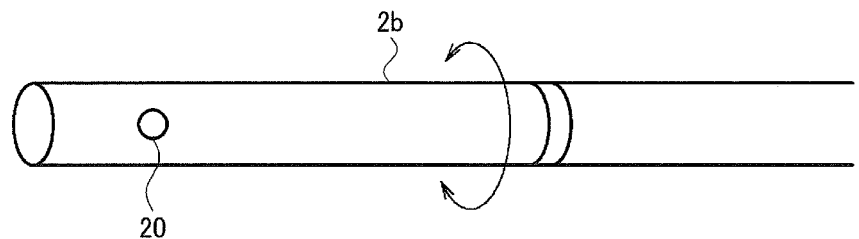
FIGS. 8A-8D illustrate other example configurations of the insertion section.
Figure 8B:
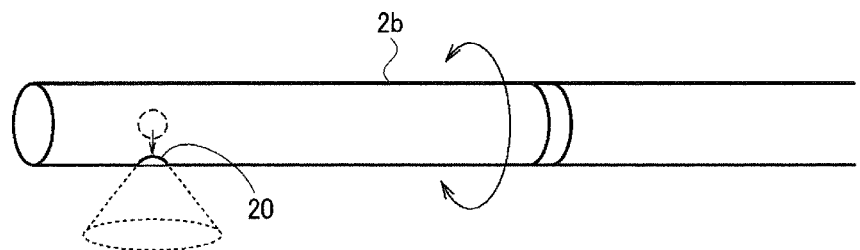

In the configurations illustrated in FIGS. 8A and 8B, a part or the whole of the insertion section 2*b* may be rotatable by means of the turning mechanism 18 similar to that of FIG. 4 or 6. The subject light acquisition section 20 provided on the side surface rotates around the reference axis AX1 in association with rotation of the insertion section 2*b*, so that the field of view of the imaging section rotates around the reference axis AX1. That is, the turning mechanism 18 can be realized by a configuration of not curving the curving section 12.

Figure 8C:
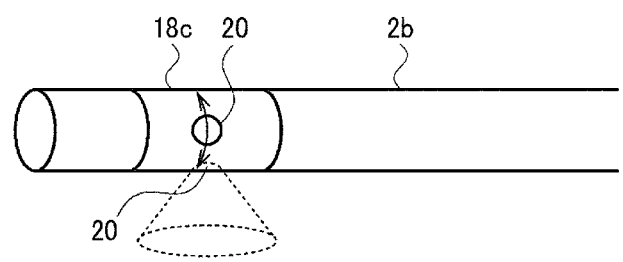

Furthermore, as illustrated in FIG. 8C, a configuration in which the insertion section 2*b* does not rotate may be provided. In FIG. 8C, the insertion section 2*b* has a transparent section 18*c*, and the subject light acquisition section 20 may be rotatable around the axis of the insertion section 2*b* inside the transparent section 18*c*. Even thus rotating the subject light acquisition section 20 inside the insertion section 2*b* enables to cause the field of view of the imaging section to rotate around the reference axis AX1.

Figure 8D:
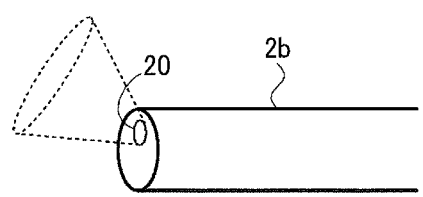

Furthermore, as illustrated in FIG. 8D, the subject light acquisition section 20 may be able to change the direction of receiving subject light. For example, the turning mechanism 18 may include an unillustrated driving section that drives an objective optical system which is the subject light acquisition section 20. The control section 33 drives the objective optical system to change the field of view of the imaging section. For example, in the case where the direction of receiving subject light can be changed to the up-down direction and the left-right direction, the light receiving direction is changed sequentially, so that the field of view of the imaging section can be rotated around the reference axis AX1. Alternatively, the field of view of the imaging section may be rotated around the reference axis AX1 by fixing the direction of acquiring subject light in a state of being inclined by a predetermined angle in a predetermined direction with respect to the reference axis AX1 and, in this state, causing a part or the whole of the insertion section 2*b* to rotate around the reference axis AX1.

Note that, in the case of using the configurations illustrated in FIGS. 8A to 8D, the optical axis of the imaging section is an axis in the insertion-withdrawal direction of the insertion section 2*b*, that is, in a direction different from the direction along the reference axis AX1. Accordingly, the captured image is suitable for diagnosis or the like for the inner wall of the lumen but not suitable for insertion-withdrawal. For example, even if a captured image which is captured in the side surface direction is displayed, it is not easy for a physician to perform insertion in the distal end direction based on this captured image.

Accordingly, the endoscope 2 may include a configuration for side surface observation and a configuration for front observation. For example, the endoscope 2 includes a second subject light acquisition section and a second imaging section for front observation, apart from the subject light acquisition section 20 and the imaging section for side surface observation. This enables to appropriately perform observation for insertion-withdrawal and observation for diagnosis.

Alternatively, the endoscope 2 may include the subject light acquisition section 20 for side surface observation, the second subject light acquisition section for front observation, and a common imaging section. In this case, the imaging section can selectively receive either one of subject light from the subject light acquisition section 20 for side surface observation and subject light from the second subject light acquisition section for front observation. For example, a light shielding member provided on, in an insertable and withdrawable manner, an optical path of light which is reflected from a subject and incident on the imaging section via the subject light acquisition section 20 or the second subject light acquisition section is controlled to select subject light. This enables one imaging section to be used with switching between observation for insertion-withdrawal and observation for diagnosis. Furthermore, in the case of using the configuration illustrated in FIG. 8D, the direction of receiving subject light may be switched between the front direction for insertion-withdrawal and the side surface direction for observation.

2.3 Example of Scan

Next, a description will be given of an example of scan, that is, a specific control example of the field of view based on the turning mechanism 18 and the advancing/retreating mechanism 17. Note that, as described above, various modifications can be implemented as to the configuration of the insertion section 2*b*, and in any of those configurations, it is possible to move the field of view of the imaging section along the longitudinal direction of the lumen and cause the field of view of the imaging section to rotate in the circumferential direction of the lumen. Accordingly, a description will be given below focusing on the field of view of the imaging section without a specific configuration of the insertion section 2*b*. Furthermore, a description will be given below considering the lumen as a cylinder, for simplification of the description.

Figure 9A:
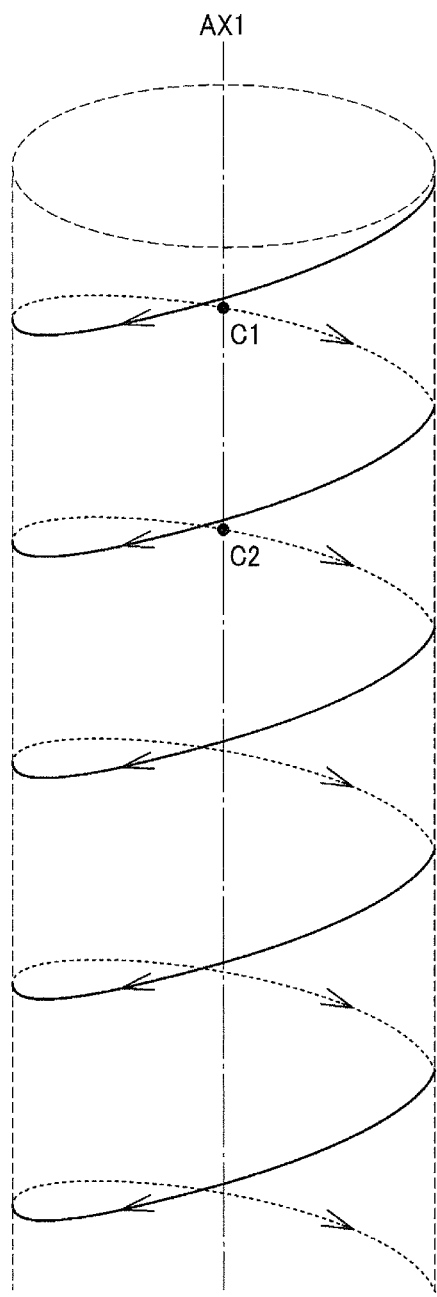
FIGS. 9A and 9B illustrate scanning by the field of view of the imaging section.
Figure 9B:
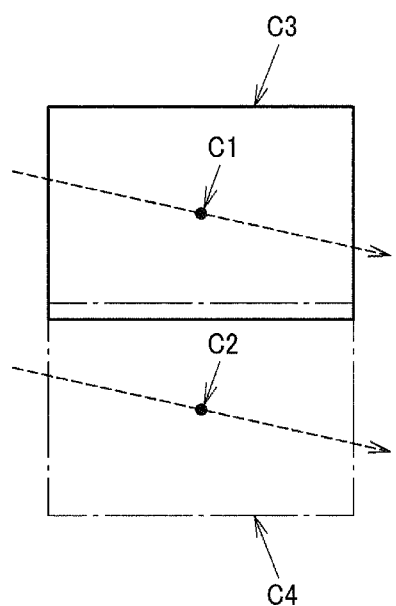

FIG. 9A is a view illustrating movement of a field of view in the case of performing spiral scan. For example, in the case where, in a surface of an intestinal tract, a range included in the field of view of the imaging section is an imaging range, FIG. 9A is a view illustrating time series variation of a reference point of the imaging range. The reference point of the imaging range is, for example, the center of the imaging range and corresponds to an intersection of the optical axis of the imaging section with the surface of the intestinal tract. FIG. 9B is a view illustrating a positional relationship between an imaging range when the reference point of the imaging range is located at C1 and an imaging range when the reference point of the imaging range is located at C2. C3 of FIG. 9B represents the imaging range corresponding to C1, and C4 represents the imaging range corresponding to C2.

The image sensor 15 acquires through the subject light acquisition section 20 reflected light from the subject corresponding to an imaging range to generate a captured image corresponding to the imaging range. The following description will be given of an example in which the vertical direction in the captured image is the direction along the reference axis AX1 and the lateral direction is the rotation direction around the reference axis AX1. However, the relationship between the vertical and lateral directions of the captured image and the direction of the reference axis AX1 is arbitrary. Furthermore, for convenience of the description, an example will be described in which the imaging range is rectangular, but the shape of the actual imaging range changes according to the imaging angle or the surface shape of the intestinal tract.

In the example illustrated in FIG. 9A, the control section 33 controls the turning mechanism 18 to cause the field of view of the imaging section to rotate around the reference axis AX1 and controls the advancing/retreating mechanism 17 to move the field of view of the imaging section in the direction along the reference axis AX1. Note that a description will be given here of an example in which the rotation speed around the reference axis AX1 and the movement speed in the direction along the reference axis AX1 are constant, but those speeds may be variable.

At this time, the control section 33 controls the turning mechanism 18 such that a field of view of the imaging section in a given frame and a field of view of the imaging section in the next frame overlap with each other in the circumferential direction of the lumen. For example, where the imaging interval of the imaging section is t (second), the rotation angle per unit time is vθ (degree/second), and the horizontal angle of view of the imaging section is θ1 (degree), the control section 33 sets vθ so as to satisfy the following equation (1). As a result, two captured images continuous in time series have an overlapping region. That is, it is possible to suppress generation of an uncaptured region in the circumferential direction of the lumen.

$$t \times v\theta \leq \theta 1 \tag{1}$$

Furthermore, the control section 33 sets a movement speed of the field of view based on the advancing/retreating mechanism 17 according to a rotation speed of the field of view based on the turning mechanism 18. For example, the control section 33 controls the advancing/retreating mechanism 17 such that a captured image in a given frame and a captured image obtained after one rotation of the field of view from there around the reference axis AX1 overlap with each other in the direction along the reference axis AX1. In the example of FIG. 9B, the control section 33 causes a region on the lower side of an imaging range indicated by C3 and a region on the upper side of C4 which is an imaging range after one rotation to overlap with each other. For example, where the rotation cycle of the field of view of the imaging section which is caused by the turning mechanism 18 is T (second), the movement speed of the field of view of the imaging section which is caused by the advancing/retreating mechanism 17 is vz (cm/second), and the length of the imaging range in the vertical direction is H (cm), the control section 33 sets vz so as to satisfy the following equation (2). Here, T=360/vθ. Furthermore, H is determined by a vertical angle of view θ2 of the imaging section and a distance L from the imaging section to the subject. Note that, as illustrated in FIG. 9A, in the case where the lumen is assumed as a column, and the reference axis AX1 coincides with an axis passing through the center of the column, the distance L is obtained based on a radius r of the column. In the case where the curving section 12 is not curved as in FIGS. 8A to 8D, the distance L can be approximated by the radius r. Furthermore, in the case where the curving section 12 is used, the distance L can be estimated based on known information such as length, curving amount, and the like of the curving section 12. This makes it possible to suppress generation of an uncaptured gap region even in the longitudinal direction of the lumen.

$$T \times vz \leq H \tag{2}$$

For example, the storage section 34 of the image processing device 3 stores, as control parameters, vθ that satisfies the above equation (1) and vz that satisfies the above equation (2). The control section 33 controls the turning mechanism 18 and the advancing/retreating mechanism 17 based on vθ and vz read from the storage section 34. This realizes control of the turning mechanism 18 and the advancing/retreating mechanism 17 such that the inner wall of the lumen is scanned by the field of view of the imaging section.

Figure 10:
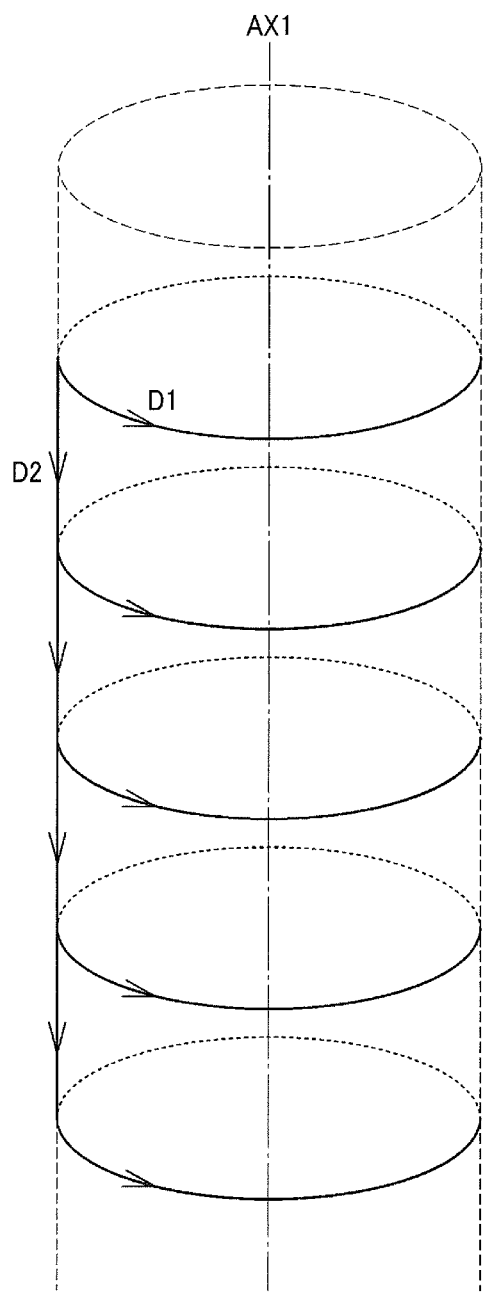
FIG. 10 illustrates scanning by the field of view of the imaging section.

FIG. 10 is another view illustrating movement of the field of view of the imaging section. As illustrated in FIG. 10, the control section 33 may alternately execute the control of the turning mechanism 18 for causing the field of view of the imaging section to rotate around the reference axis AX1 and the control of the advancing/retreating mechanism 17 for moving the field of view of the imaging section in the direction along the reference axis AX1. In the example of FIG. 10, the control section 33 first controls the turning mechanism 18 to cause the field of view to rotate once around the reference axis AX1 (D1) and thereafter controls the advancing/retreating mechanism 17 to move the field of view in the direction along the reference axis AX1 (D2). The same applies thereafter, and rotation of the field of view around the reference axis AX1 and movement of the field of view in the direction of the reference axis AX1 are repeated alternately.

The control section 33 controls the turning mechanism 18 based on, for example, vθ that satisfies the above equation (1), similarly to the example of FIG. 9. However, the advancing/retreating mechanism 17 is controlled exclusively with respect to the turning mechanism 18 and thus has less constraints on its control. Specifically, the movement speed of the field of view which is caused by the advancing/retreating mechanism 17 is arbitrary, and it is sufficient that the control section 33 controls the movement amount by one movement. For example, the control section 33 controls the advancing/retreating mechanism 17 such that the movement amount by one movement indicated by D2 is equal to or less than H which is the length of the imaging range in the vertical direction. This makes it possible to suppress generation of an uncaptured region in the longitudinal direction of the lumen.

Furthermore, in FIGS. 9A and 10, a description has been given of the scan in the case where the field of view of the imaging section is continuously rotatable in the same direction. However, depending on the configuration of the turning mechanism 18, a case is also considered in which the rotation frequency in the same direction is restricted. For example, in the case where the rotating mechanism 18b is provided on the distal end side of the insertion section 2b as illustrated in FIG. 6, since a portion including the rotating mechanism 18b is subjected to washing and the like, a mechanical seal is required which can withstand washing in order to realize multiple rotation. In contrast, restricting the rotation frequency in the same direction makes it easy to realize a seal. Accordingly, the control section 33 may perform control not including continuous rotation in the same direction.

Figure 11:
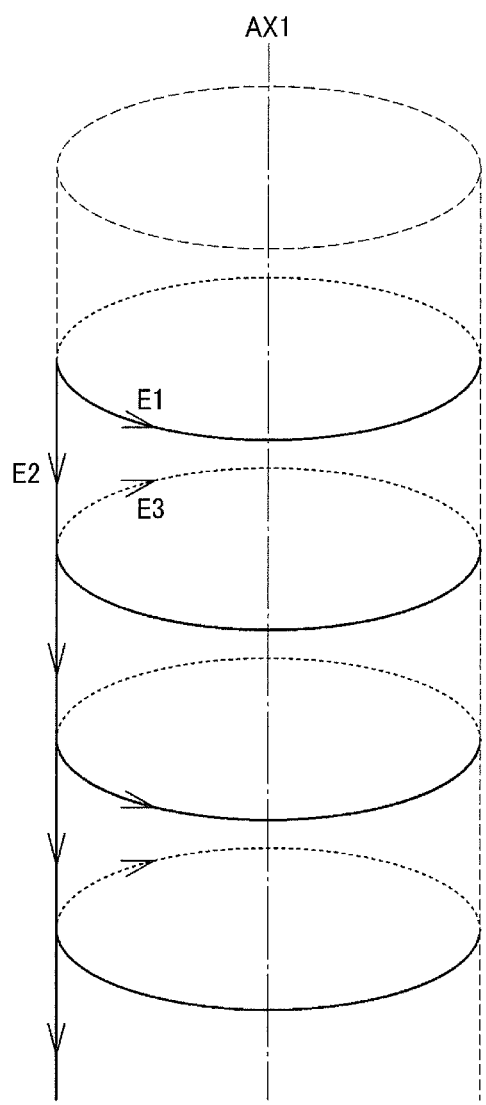
FIG. 11 illustrates scanning by the field of view of the imaging section.

FIG. 11 is another view illustrating movement of the field of view of the imaging section. Similarly to the example illustrated in FIG. 10, the control section 33 alternately executes the control of the turning mechanism 18 for causing the field of view of the imaging section to rotate around the reference axis AX1 and the control of the advancing/retreating mechanism 17 for moving the field of view of the imaging section in the direction along the reference axis AX1. However, the control section 33 controls the turning mechanism 18 so as to alternately perform rotation of the field of view of the imaging section in a predetermined direction and rotation of the field of view of the imaging section in the reverse direction.

In the example of FIG. 11, the control section 33 causes the field of view of the imaging section to rotate once in a predetermined direction (E1), moves the field of view of the imaging section by a predetermined amount in the direction along the reference axis AX1 (E2) and then performs control of causing the field of view of the imaging section to rotate once in the reverse direction of E1 (E3). The same applies thereafter, and the rotation direction is switched for every one rotation. The example has been illustrated here in which the rotation frequency continuous in a predetermined direction is one rotation, the rotation frequency may be two or more rotations.

In this case, the control section 33 also controls the turning mechanism 18 and the advancing/retreating mechanism 17 so as to suppress generation of an uncaptured region in both of the circumferential direction and longitudinal direction of the lumen. For example, the control section 33 controls the turning mechanism 18 based on, for example, vθ that satisfies the above equation (1) and controls the advancing/retreating mechanism 17 such that the amount of one movement indicated by E2 is equal to or less than H which is the length of the imaging range in the vertical direction.

As described above, the endoscope system 1 according to the present embodiment includes the insertion section 2b to be inserted into a lumen, the subject light acquisition section 20, the imaging section, the turning mechanism 18, the advancing/retreating mechanism 17, and the control section 33. The subject light acquisition section 20 is provided in the insertion section 2b and acquires subject light which is light from a subject. The imaging section performs imaging based on the subject light to acquire a captured image within the field of view. The turning mechanism 18 causes the subject light acquisition section 20 to rotate. For example, in the case where the axis of the insertion section 2b is used as the reference axis AX1, the turning mechanism 18 causes the subject light acquisition section 20 to rotate with the reference axis AX1 used as the rotational axis. The advancing/retreating mechanism 17 moves the insertion section 2b in the insertion direction or the withdrawal direction. The insertion direction is the distal end direction of the lumen and is, in the case where the lumen is an intestinal tract, a direction from the anus toward the vicinity of the cecum. The withdrawal direction is the opposite direction of the insertion direction. For example, the advancing/retreating mechanism 17 moves the insertion section 2b in a direction corresponding to the reference axis AX1. The control section 33 controls the turning mechanism 18 and the advancing/retreating mechanism 17 to control movement of the field of view of the imaging section. Then, the control section 33 controls the turning mechanism 18 and the advancing/retreating mechanism 17 such that the inner wall of the lumen is scanned by the field of view.

Here, the direction corresponding to the reference axis AX1 is the same or substantially the same direction as the reference axis AX1 and represents a direction in which an angle formed by this direction and the reference axis AX1 is equal to or less than a given angle threshold value.

According to the method of the present embodiment, in the endoscope system 1 having the turning mechanism 18 and the advancing/retreating mechanism 17 which allow automatic control of the insertion section 2b, it is possible to perform imaging so as to scan the inner wall of the lumen. Generation of an uncaptured portion is suppressed in observation using the endoscope system 1, so that it is possible to suppress missing of a region of interest.

Furthermore, the control section 33 performs scan by combining movement of the insertion section 2b in the direction along the reference axis A1 by using the advancing/retreating mechanism 17 and periodical rotation of the subject light acquisition section 20 in the circumferential direction of the lumen by using the turning mechanism 18.

The periodical rotation mentioned here may be continuous repeat of rotation in the same direction as in FIG. 9A.

Furthermore, the periodical rotation may be intermittent repeat of rotation. The intermittent repeat indicates that, for example, as in FIG. 10, rotation by a given rotation amount in a given direction is performed, and thereafter, with a period in which movement in the direction along the reference axis AX1 is performed, rotation by the same rotation amount in the same direction is performed again. Furthermore, the periodical rotation may include both of the rotation in a given direction and the rotation in the reverse direction as in FIG. 11.

As a result, performing the periodical control enables to suppress generation of an uncaptured portion. That is, as long as control for one cycle can be realized, it is only required to repeat the same control thereafter. Accordingly, the amount of information necessary for the control can be reduced, and automation of the control is also easily achieved. The information necessary for the control includes, for example, control parameters such as vθ and vz described above, and control programs for causing the control section 33 to execute the control of the advancing/retreating mechanism 17 and the turning mechanism 18 in accordance with the control parameters.

Furthermore, a captured image which is captured by the imaging section at a given timing is used as a first captured image. After capturing of the first captured image, the control section 33 performs control in which the control of causing the subject light acquisition section 20 to rotate substantially once around the reference axis AX1 and the control of moving the insertion section 2b in the direction along the reference axis AX1 by using the advancing/retreating mechanism 17 are combined, and after the control, a captured image which is captured by the imaging section is used as a second captured image. In this case, the control section 33 controls the turning mechanism 18 and the advancing/retreating mechanism 17 such that a field of view when the first captured image is captured and a field of view when the second captured image is captured have an overlapping portion. In other words, the control section 33 controls the turning mechanism 18 and the advancing/retreating mechanism 17 such that the first captured image and the second captured image have an overlapping portion.

Considering a case of thoroughly capturing the whole inner surface of the lumen, it is important that the captured images overlap with each other. For example, as illustrated in the above equation (1), it is required to control the rotation speed caused by the turning mechanism 18 such that a captured image in a given frame and a captured image in the next frame overlap with each other. However, in the case where the inner wall of the lumen is observed while the field of view of the imaging section is rotated, it is also required to take into consideration overlapping of one given rotation and the next one rotation. Specifically, as illustrated in the above equation (2), it is required to control the movement speed or movement amount caused by the advancing/retreating mechanism 17.

The first captured image is, for example, an image in which the imaging range indicated by C3 is captured, and the second captured image is, for example, an image in which the imaging range indicated by C4 is captured. The first captured image and the second captured image have an overlapping region, thereby suppressing generation of a gap between an imaging range which is captured in a given captured image and an imaging range which is captured in a different captured image, in the longitudinal direction of the lumen.

Note that, depending on the setting of the imaging frame rate and the rotation speed caused by the turning mechanism 18, the first captured image and the second captured image are not necessarily the ones in which subject light is captured in the same direction. That is, the rotation angle for the substantially one rotation described above may be 360° but, not limited to this, may be another angle at which the difference from 360° is equal to or less than a given threshold value.

Furthermore, taking the example of FIG. 11 into consideration, the second captured image is not limited to an image which is captured in a state in which the field of view is rotated substantially once with the first captured image used as the reference. For example, a captured image in which subject light from a direction where the rotation angle around the reference axis AX1 is $\varphi_A$ is captured by the imaging section is used as the first captured image. Then, after capturing of the first captured image, the control section 33 performs the control in which the control of causing the subject light acquisition section 20 to rotate around the reference axis AX1 and the control of moving the insertion section 2b in the direction along the reference axis AX1 by using the advancing/retreating mechanism 17 are combined, and after the control performed by the control section 33, a captured image in which subject light from a direction where the rotation angle around the reference axis AX1 is $\varphi_B$ is captured by the imaging section may be used as the second captured image. $\varphi_B$ represents an angle at which the difference from $\varphi_A$ is equal to or less than a predetermined threshold value. That is, specific movement of the field of view of the imaging section from capturing of the first captured image to capturing of the second captured image is arbitrary. For example, the field of view of the imaging section may rotate once in a given direction, or the rotation direction may be switched halfway. Even in that case, by performing the control in which the first captured image which is captured in a given direction of directions vertical to the reference axis AX1 and the second captured image which is captured in substantially the same direction after the first captured image overlap with each other, generation of an uncaptured portion in the longitudinal direction of the lumen is suppressed.

Furthermore, as illustrated in FIG. 9A, the control section 33 may perform the rotation using the turning mechanism 18 and the movement using the advancing/retreating mechanism 17 to perform control of spirally moving the subject light acquisition section 20. In a narrow sense, the rotation using the turning mechanism 18 and the movement using the advancing/retreating mechanism 17 are performed simultaneously. Furthermore, as illustrated in FIGS. 10 and 11, the control section 33 may perform control of alternately performing the rotation using the turning mechanism 18 and the movement using the advancing/retreating mechanism 17.

In the case where the rotation using the turning mechanism 18 and the movement using the advancing/retreating mechanism 17 are performed simultaneously, it is possible to speed up observation of the lumen. This enables to reduce burdens on the physician and the patient. In the case where the rotation using the turning mechanism 18 and the movement using the advancing/retreating mechanism 17 are performed alternately, the control of causing two kinds of field of view of the imaging section to overlap with each other becomes easier. This enables to further suppress generation of an uncaptured region.

Furthermore, the turning mechanism 18 may have a mechanism that allows the distal end of the insertion section 2b to rotate around the reference axis AX1. Specifically, the mechanism mentioned here corresponds to the rotating mechanism 18b illustrated in FIG. 6.

This eliminates the need for causing the whole insertion section 2b to rotate, so that the operation section 2a does not move in association with rotation of the insertion section 2b and the observation becomes easier. On the other hand, in the case where the whole insertion section 2b is caused to rotate as illustrated in FIG. 4, it is advantageous in that there is no need to take a seal of the rotation mechanism into consideration.

Furthermore, in the present embodiment, observation of the lumen may be performed by inserting the insertion section 2b in the distal end direction of the lumen and thereafter withdrawing it in the proximal end direction. The insertion in the distal end direction is insertion normally from an anus to a cecum or to the deepest insertable portion of a cecum. Then, the control section 33 controls the turning mechanism 18 and the advancing/retreating mechanism 17 at least at the time of proximally withdrawing the insertion section 2b.

At the time of insertion of the insertion section 2b in a lumen structure of a large intestine or the like, it is required to go beyond various bend sections. During the insertion, a method is used in which, for example, the lumen is degassed for ease of the insertion and then the distal end section 11 is pressed against the wall surface of the lumen, which makes observation of the lumen structure difficult. Accordingly, observation of the inner wall of the lumen is performed in a state in which air is sent to the lumen after the insertion into the innermost part.

The method of the present embodiment is related to control of the insertion section 2b for suppressing missing of a lumen structure, and the control is preferable for the time of withdrawal.

However, the control section 33 is not prevented from controlling the turning mechanism 18 and the advancing/retreating mechanism 17 at the time of insertion of the insertion section 2b in the distal end direction of the lumen. As described above, the insertion requires operations such as going beyond bend sections, and various methods are known such as a colonic fold shortening method. The control section 33 controls the turning mechanism 18 and the advancing/retreating mechanism 17, which enables to appropriately support the insertion of the insertion section 2b. For example, it is possible to execute appropriate insertion without depending on the proficiency of the physician, reducing a burden on the patient.

Furthermore, the method of the present embodiment can be applied to a lumen operation method below. The lumen operation method includes inserting the insertion section 2b of the endoscope system 1 into a lumen, and performing a turning operation of causing the subject light acquisition section 20 to rotate and an advancing/retreating operation of moving the imaging section in the insertion direction or withdrawal direction of the insertion section 2b so as to perform scan of the inner wall of the lumen by the field of view of the imaging section. For example, the turning operation is an operation to cause the subject light acquisition section 20 to rotate with the reference axis AX1 used as the rotational axis. Furthermore, the advancing/retreating operation is an operation to move the insertion section 2b in the direction along the reference axis AX1. The endoscope system 1 mentioned here has, as described above, the insertion section 2b, the subject light acquisition section 20 that is provided in the insertion section 2b and acquires subject light which is return light from a subject, and the imaging section that performs imaging based on the subject light to acquire a captured image within the field of view.

Furthermore, the lumen operation method may perform the scan by combining the advancing/retreating operation and the turning operation of causing the subject light acquisition section 20 to periodically rotate in the circumferential direction of the lumen.

2.4 Specific Control at the Time of Scan

Figure 14:
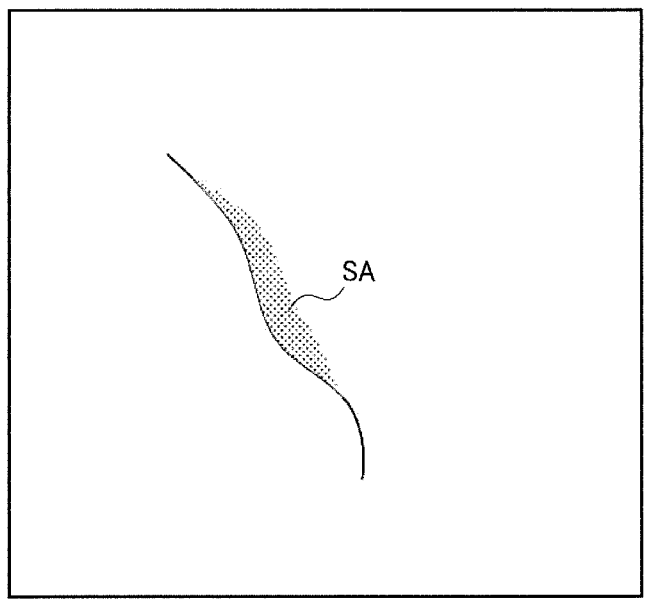
FIG. 14 illustrates an example of a captured image where a hidden portion due to folds or the like is present.

Performing the control of the turning mechanism 18 and the advancing/retreating mechanism 17 described above enables to comprehensively perform imaging of an inner surface of a lumen structure. However, in the case where the lumen is easily deformed, depending on the state of the lumen, it is difficult to appropriately perform the imaging even if the above control is performed. For example, in the case where the lumen is an intestinal tract, since the intestinal tract expands and contracts, the state of the folds and the like changes according to the atmospheric pressure in the intestinal tract. In the case where insufflation is not sufficient, a hidden portion described later with reference to FIG. 14 is easily generated, and accordingly missing also easily occurs.

Thus, the control section 33 controls the turning mechanism 18 and the advancing/retreating mechanism 17 to perform control of maintaining the state of the lumen at the time of performing the scan of the inner wall of the lumen. This makes it possible to suppress contact of the distal end section 11 of the insertion section 2b, in a narrow sense, the subject light acquisition section 20, with the wall surface of the lumen, obstruction of other portions by a part of the lumen, and the like. That is, it is possible to suppress generation of a hidden portion which is not sufficiently captured in the captured image, and the like.

More specifically, the control section 33 executes, as the control of maintaining the state of the lumen, control of performing insufflation for injecting gas into the lumen and degassing for discharging gas from the lumen. This makes it possible to maintain the atmospheric pressure in the intestinal tract, and thus a state suitable for observation can be maintained appropriately. Note that, as described above, in observation of an intestinal tract, it is important to perform control of inflating the intestinal tract by insufflation. However, excessive insufflation may increase a burden on the patient. Performing both of insufflation and degassing makes it possible to maintain an appropriate state.

Furthermore, the control section 33 may execute, as the control of maintaining the state of the lumen, control of adjusting the body position of the subject. In the case where a portion within a living body such as an intestinal tract is an observation target, the state of the intestinal tract changes depending on the body position of the subject. The body position mentioned here includes, for example, right lateral decubitus position, left lateral decubitus position, supine position, and the like. Controlling the body position makes it possible to facilitate observation of the intestinal tract.

Note that "maintaining the state of the lumen" mentioned here indicates maintaining the state of the lumen which is suitable for observation. That is, in the case where a fixed body position is suitable for observation, the control of maintaining the state of the lumen corresponds to control for keeping the body position fixed. However, in the case where a preferable body position differs depending on a portion of the intestinal tract, taking a body position according to the portion makes it possible to maintain the state of the lumen suitable for observation. In this case, the control of maintaining the state of the lumen corresponds to control of causing the body position to be changed according to the portion.

Note that the control of adjusting the body position of the subject may be control of presenting information for an instruction for change of the body position. Alternatively, the control of adjusting the body position of the subject may be control of the bed 8 on which the subject lies. For example, the bed 8 may include a driving section for changing the inclination, and the control section 33 may adjust the body position of the subject by outputting a signal for instructing the driving section to drive.

Note that both of the control of performing insufflation and degassing and the control of adjusting the body position of the subject may be performed, or either one of them may be performed.

2.5 Re-Scan

Furthermore, in the present embodiment, feedback on the scan may be performed based on an imaging result. Specifically, the control section 33 may perform re-scan in the case where it is determined that, in the portion of the lumen where the scan has been performed, a portion which is not within the field of view of the imaging section exists. Not within the field of view mentioned here specifically indicates never having been within the field of view of the imaging section during a period from the start of the scan to the process target timing.

For example, when two imaging ranges indicated by C3 and C4 of FIG. 9B do not overlap with each other, the control section 33 determines that a portion not within the field of view of the imaging section exists. More specifically, the control section 33 performs a process of comparing the first captured image and the second captured image to determine whether an overlapping portion is present or not. For example, the control section 33 performs template matching for using a part of the first captured image as a template image. Alternatively, if luminal structure information is acquirable as described later in the third embodiment, when there is a lack of the luminal structure information, the control section 33 may determine that a portion not within the field of view of the imaging section exists.

The re-scan may be performed by, for example, after reinsertion of the insertion section 2b by a predetermined amount in the distal end direction, using the scan conditions similar to those until then. The scan conditions mentioned here include at least the control conditions of the turning mechanism 18 and the control conditions of the advancing/retreating mechanism 17. For example, the scan conditions include the rotation speed caused by the turning mechanism 18 and the movement speed or movement amount caused by the advancing/retreating mechanism 17. Alternatively, as described later in the second embodiment, the re-scan may have scan conditions which have been changed. For example, the control section 33 suppresses the movement speed or movement amount of the distal end section 11 in the direction along the reference axis AX1 which is caused by the advancing/retreating mechanism 17.

3. Second Embodiment

Figure 12:
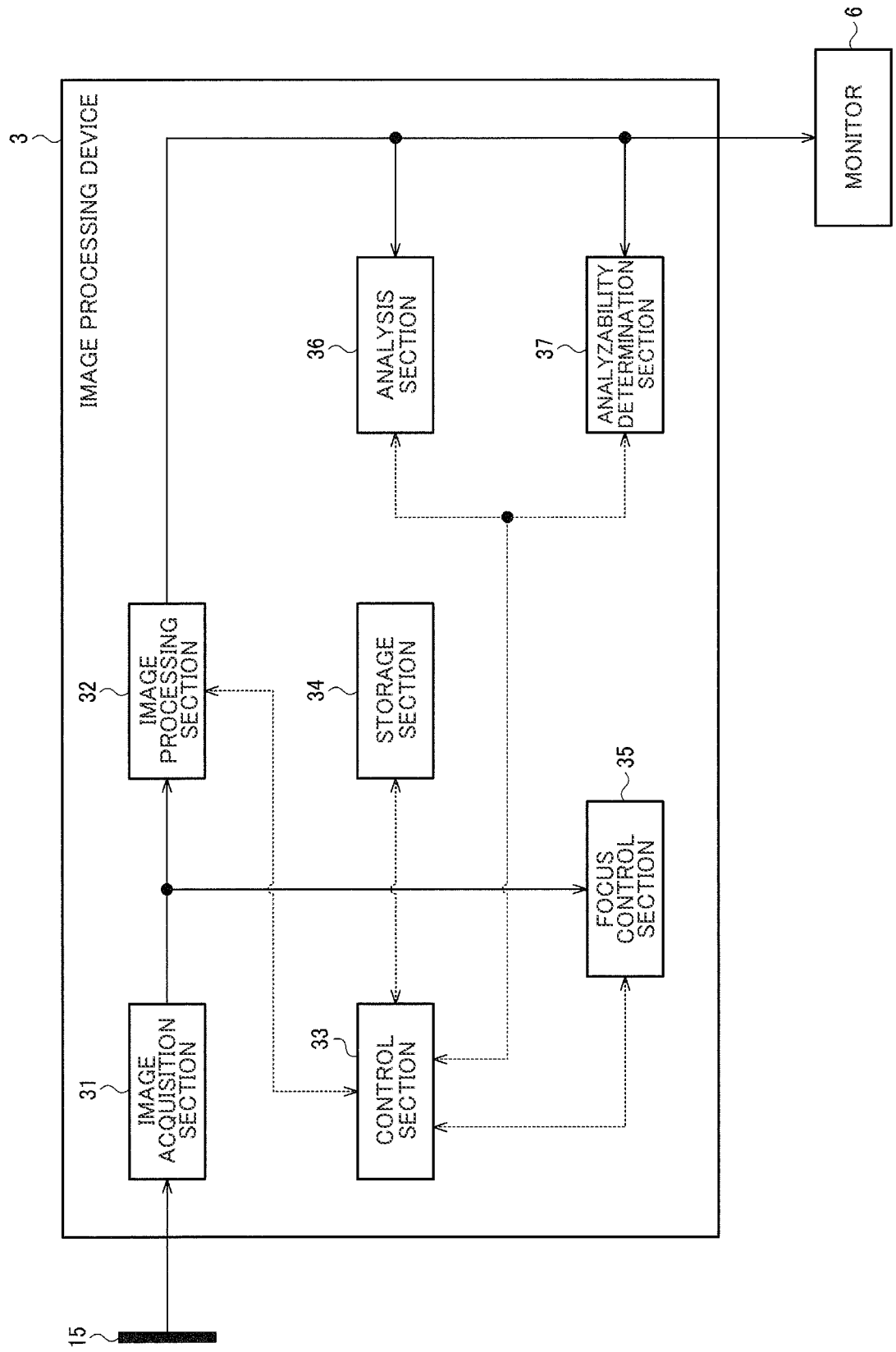
FIG. 12 illustrates another example configuration of an image processing device.

FIG. 12 is a diagram illustrating a configuration example of an image processing device 3 of the present embodiment. As illustrated in FIG. 12, the image processing device 3 may include, in addition to the configuration described above referring to FIG. 3, an analysis section 36 and an analyzability determination section 37. However, the image processing device 3 is not limited to the configuration of FIG. 12, and various modifications may be made in implementation, such as omitting any one of the analysis section 36 and the analyzability determination section 37 or adding other components. Hereinafter, both of the sections will be described in detail. Furthermore, at least one of the analysis section 36 and the analyzability determination section 37 may be provided in a device different from the image processing device 3.

3.1 Analysis Section

The analysis section 36 conducts an analysis on the basis of a captured image. For example, when a region of interest is a lesion, the analysis may be a detection process of detecting the lesion from the captured image, and may be a classification process of classifying the lesion in accordance with its degree of malignancy. By including the analysis section 36, it becomes possible to support a user not only for a scan of the insertion section 2b but also for the analysis regarding the region of interest.

The analysis section 36 performs image processing to the captured image to thereby perform the detection process or the classification process. The image processing mentioned here is, for example, a process that obtains a feature amount on the basis of the image to determine whether or not the feature amount satisfies a predetermined condition. The feature amount may be luminance of the image, may be brightness, hue, or saturation, may be a result of edge extraction process, or may be a result of matching process using a predetermined template image. The template image is, for example, an image obtained by capturing the region of interest. Determining whether or not the condition is satisfied correspond to, for example, a process of comparing a value of the feature amount and a given threshold value.

Alternatively, the analysis section 36 may use a trained model to conduct the analysis. For example, a learning device performs processing of generating the trained model on the basis of training data in which correct data is provided to a training image. The training image is an image obtained by capturing the inside of a lumen. In a narrow sense, the training image is an in-vivo image obtained by capturing an intestinal tract. The correct data is information that specifies the region of interest contained in the training image. The correct data mentioned here is information that specifies a position of a detection frame containing the region of interest and a type of a subject included in the detection frame. The type of the subject includes, for example, a "normal submucosa", a "polyp", and the like. Alternatively, the correct data may be information about pixels of the training image, the information specifying the type of the subject whose image is captured in the pixels.

The model mentioned here is, for example, a neural network, which is widely known. The machining device inputs the training image to the neural network, and performs calculation using a weighted coefficient of that time to obtain output. The learning device obtains an error function representing an error between the output and the correct data, and updates the weighted coefficient so as to make the error function smaller. For updating the weighted coefficient, a widely known error back propagation method, for example, can be applied. The learning device generates the trained model by repeating updates of the weighted coefficient using a number of pieces of learning data.

The storage section 34 of the image processing device 34 stores the trained model. The trained model mentioned here includes the weighted coefficient. Furthermore, the trained model may include an inference program for performing calculation in a forward direction on the basis of the weighted coefficient. The analysis section 36 acquires the trained model from the storage section 34. The analysis section 36 inputs the captured image output from the image processing section 32 to the trained model, to thereby acquire an analysis result. The analysis result is, as described above, the information that specifies the detection frame and the type of the subject included in the detection frame. Alternatively, the analysis result is information about pixels of the captured image as input, the information specifying a type of the subject whose image is captured in the pixels. Furthermore, the analysis result may include information indicating probability of the detection frame and the type of the subject.

The control section 33 controls the twisting mechanism 18 and the advancing/retreating mechanism 18 so as to scan the inner wall of the lumen by a portion where an analysis by the analysis section is possible of a field of view corresponding to the captured image.

As described in the first embodiment, by scanning the inner wall of the lumen by the field of view of the imaging section, it is possible to suppress generation of portions overlooked without ever coming in the field of view. However, even if the portion is in the field of view, in the case where the portion is not imaged in an analyzable state, it is impossible to appropriately execute the analysis by the analysis section 36. Specifically, reduction in accuracy of the above-described detection process or the classification process may lead to undetection of the region of interest and misclassification. On the contrary, by performing the scan not for the entire field of view but for the analyzable part of the field of view, it becomes possible to enhance probability that the analysis can be executed appropriately.

Specifically, in the captured image, when the region where the analysis by the analysis section 36 is possible is regarded as an analyzable region, the control section 33 controls the turning mechanism 18 and the advancing/retreating mechanism 17 so that an analyzable region corresponding to the first captured image overlaps with an analyzable region corresponding to the second captured image. As described above, the first captured image is an image obtained by imaging an imaging range shown by C3 in FIG. 9B, for example, and the second captured image is an image obtained by imaging an imaging range shown by C4. As a result, it is possible to determine on the basis of the captured image whether or not an appropriate scan has been performed by the analyzable portion of the field of view.

For example, when it is known before the scan that a bright image appropriate for analysis can be acquired in the central region of the captured image whereas a dark image inappropriate for analysis is obtained in a peripheral region, the storage section 34 stores a rotation speed $v\theta$ and a movement speed $vz$ set so as to make the central regions overlap with each other. Then, the control section 33 controls the turning mechanism 18 and the advancing/retreating mechanism 17 on the basis of the information stored in the storage section 34.

However, in some cases, which region of the captured image is the analyzable image does not become apparent until the captured image is acquired. In such case, the unanalyzable region is determined on the basis of a result of determination by the analyzability determination section 37. When it is determined on the basis of the determined analyzable region that the analyzable regions of the plurality of captured images do not overlap, the control section 33 may perform a re-scan.

Furthermore, when the analysis section 36 detects the region of interest from the captured image, the control section 33 may perform at least one of a process of storing information about the region of interest and a process of presenting the user of the information about the region of interest.

The analysis by the analysis section 36 may be executed in real time during observation, for example. In such case, by performing the process of presenting the user of the information about the region of interest, it becomes possible to support observation by the user of the region of interest. For example, it is possible to prevent the user from missing the region of interest although being imaged. Alternatively, by storing the information about the region of interest detected in real time, presentation to the user at an arbitrary timing after the observation or the like becomes possible.

Furthermore, the analysis by the analysis section 36 may be executed after the observation, for example. In such case, as a result that the user acquires and views the stored information about the region of interest, it becomes possible to determine presence/absence of the region of interest and a degree of malignancy at an arbitrary timing.

3.2 Analyzability Determination

Next, a determination process executed by the analyzability determination section 37 will be described. The analyzability determination section 37 makes determination on the basis of the captured image whether or not a subject imaged in the captured image is in an analyzable state. Information output by the analyzability determination section 37 is also represented as analyzability information. Hereinafter, of the luminal structure, a portion imaged in the analyzable state is represented as an analyzable portion and a portion other than the analyzable portion is represented as an unanalyzable portion.

Firstly, consideration will be made what is analyzable/unanalyzable. As described also in the first embodiment, in the first place, the portion not coming in the field of view of the imaging section ever is unanalyzable. For example, as described above, when the first captured image and the second captured image do not overlap, it is determined that there is an unanalyzable portion out of the field of view. Alternatively, as described later in a third embodiment, whether the unanalyzable portion exists or not is determined on the basis of a lack of luminal structure information acquisition.

As examples of the unanalyzable portion determined to be in the field of view but to be unanalyzable, the following two portions may be assumed. First, the unanalyzable portion is a portion that is positioned within the field of view of the imaging section and appears on the captured image, but imaged under bad imaging conditions. Second, the unanalyzable portion is a portion that is positioned within the field of view of the imaging section but does not appear on the captured image.

The bad imaging conditions correspond to a case where a resolution is low or the like because of factors such as a long distance between the imaging section and the lesion, a diagonal imaging direction of the lesion, or the like. The low resolution means that a size of the lesion on the image is considerably small. In the portion with bad imaging conditions, imaging itself has been performed, but accuracy of lesion detection or a degree of malignancy determination is low and desired analysis cannot be executed. Accordingly, in the method of the present embodiment, when there is a portion with bad imaging conditions, it is determined that there is a fear of missing the lesion.

Furthermore, the portion not appearing on the captured image corresponds to a portion obstructed by, for example, an obstacle. The obstacle here is an object other than the intestinal tract, such as a residue, bubbles, waste water, or a hemostatic clip. Of the intestinal tract, the portion obstructed by the obstacle cannot be visually recognized on the captured image, and therefore the lesion existing behind the obstacle is missed. Accordingly, when there is an obstacle, it is also determined that there is a fear of missing the lesion. Therefore, the portion that is positioned within the field of view of the imaging section but does not appear on the captured image includes a hidden portion generated due to the luminal structure such as ridges. The hidden portion is, for example, a back side of the ridge. Of surfaces of the ridge, the back side represents the surface positioned at the opposite side to the imaging section. The back side of the ridge is obstructed by the surface on the side of the imaging section of the ridge, and therefore not captured in the captured image even when being in the field of view.

The analyzability determination section 37 determines that, of the intestinal tract, the portion positioned within the field of view of the imaging section, appears on the captured image, and has good imaging conditions is the analyzable portion. The analyzability determination section 37 determines the portion other than the analyzable portion as the unanalyzable portion.

As the above description shows, the three states mentioned below are conceivable as the unanalyzable portion. In the method of the present embodiment, the unanalyzable portion may be classified into any of the following (1) to (3). For convenience of description, the unanalyzable portion classified into (1) is also represented as a first unanalyzable portion. Similarly, the unanalyzable portions classified into (2) and (3) are represented as a second unanalyzable portion and a third unanalyzable portion, respectively. Furthermore, in the case where classification is not required, all of the following (1) to (3) are simply represented as an unanalyzable portion. Furthermore, the classification is not limited to the following three items, and may be further segmentalized.

(1) A portion that is positioned within the field of view of the imaging section and appears on the captured image, but imaged under bad imaging conditions.
(2) A portion that is positioned within the field of view of the imaging section but does not appear on the captured image.
(3) A portion that has not come into the field of view of the imaging section ever.

The analyzability determination section 37 detects, of the captured image, a region on the image corresponding to the unanalyzable portion as the unanalyzable region. Note that when the unanalyzable portion is segmentalized, a region on the image corresponding to the first unanalyzable portion is regarded as a first unanalyzable region. Similarly, a region on the image corresponding to the second unanalyzable portion is regarded as a second unanalyzable region. Because the third unanalyzable portion is not imaged, it is not necessary to consider a third unanalyzable region.

Figure 13:
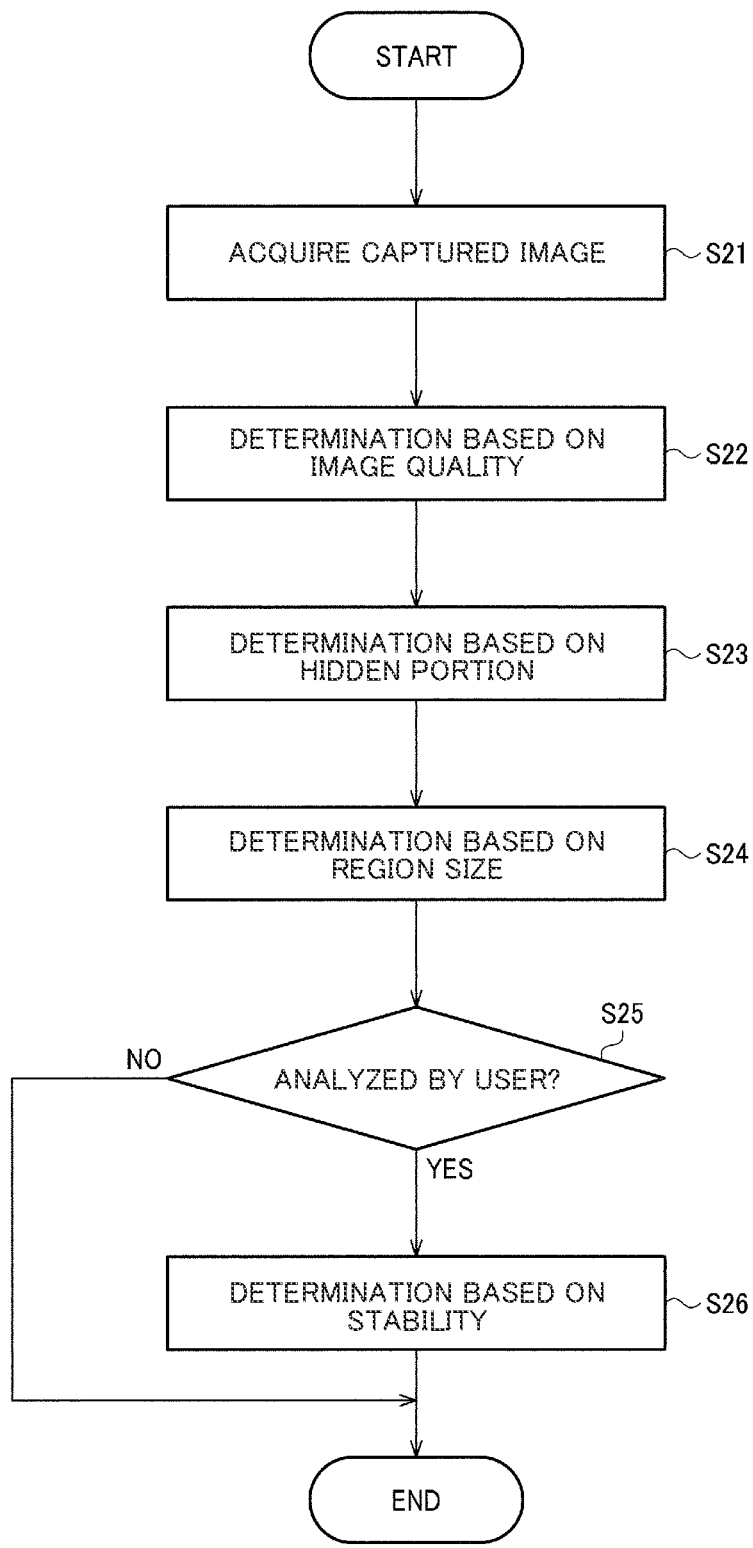
FIG. 13 is a flowchart illustrating an analyzability determination process.

FIG. 13 is a flowchart illustrating an analyzability determination process. When this process is started, the analyzability determination section 37 first acquires the captured image from the image processing section 32 (S21). Next, the analyzability determination section 37 determines analyzability on the basis of image quality of the captured image (S22). The image quality here is specifically information that indicates brightness of the captured image, an imaging angle, and a degree of obstruction. The degree of obstruction is, in a narrow sense, presence or absence of the obstacle.

The information indicating brightness is specifically information of luminance. The luminance is a weighted sum of three pixel values of RGB, and various weights are applicable. Of the captured image, an extremely bright region such as an overexposed region does not contain specific information of the lumen, and is not appropriate for analysis. The information of the lumen contains various types of information such as uneven structure of the luminal surface, blood vessel structure of the luminal surface or its inside, and a color of the submucosa. Accordingly, the analyzability determination section 37 determines that, of the captured image, a region having brightness equal to or higher than predetermined brightness is the unanalyzable region. For example, the analyzability determination section 37 determines that a region having luminance equal to or higher than a given first luminance threshold value is the unanalyzable region.

Of the captured image, an extremely dark region such as an underexposed region also does not contain specific information of the lumen, and is not appropriate for analysis. Accordingly, the analyzability determination section 37 determines that, of the captured image, a region having brightness equal to or lower than the predetermined brightness is the unanalyzable region. For example, the analyzability determination section 37 determines a region having luminance equal to or lower than a given second luminance threshold value as the unanalyzable region. In the determination, the relation of the first luminance threshold value>the second luminance threshold value is held. Furthermore, as information indicating brightness, other information such as lightness may be used.

Note that the overexposed or underexposed region is determined by the analyzability determination section 37 as the second unanalyzable region because it is highly probable that the luminal information is lost in such region. However, depending on setting of the threshold value, the luminal information remains in some cases despite its low visibility. Accordingly, the analyzability determination section 37 may determine that the region determined as the unanalyzable region on the basis of brightness is the first unanalyzable region. Furthermore, the analyzability determination section 37 may omit classification of the unanalyzable region.

Furthermore, the analyzability determination section 37 detects the obstacle in the lumen and determines that the region where the luminal surface is obstructed by the obstacle is the unanalyzable region. The obstacle such as a residue, waste water, bubbles, blood, a hemostatic clip has a color different from that of the luminal surface such as a submucosa. Accordingly, the analyzability determination section 37 performs a conversion process based on, for example, the captured image from the pixel values of RGB into an HSV color space. The analyzability determination section 37 then determines that, of the captured image, a region whose hue or saturation is within a given range is the unanalyzable region obstructed by the obstacle. Furthermore, the analyzability determination section 37 may perform a conversion process from the pixel values of RGB into a YCrCb color space and detect the obstacle on the basis of at least one of Cr and Cb as color difference signals. Furthermore, the analyzability determination section 37 may perform a filtering process such as shade correction when brightness is inconsistent, and then perform the determination process of the color. The shade correction process is, for example, a gamma correction process for each region. Furthermore, like a hemostatic clip, when the color or shape of the obstacle is known, the analyzability determination section 37 may perform a process of detecting the obstacle through a process of comparing a sample image of the obstructed object and the captured image.

Note that even when the region covered by the obstacle exists, in the case where an area of the region is sufficiently small, probability that the region of interest such as a polyp exists under the obstructed object is low. Accordingly, the analyzability determination section 37 may determine that, of the region covered by the obstacle, the region having a size equal to or larger than a predetermined size is the unanalyzable region. The size here may be a size on the image or may be an actual size on the lumen. Conversion from the size on the image into the actual size can be executed on the basis of optical characteristic information of a lens, an image sensor, or the like and distance information to a subject. The optical characteristic information is known in design. The distance information may be acquired using a distance sensor or calculated on the basis of a stereo image using a stereo camera. Furthermore, the distance information may be obtained using a calculation result of luminal structure information described later in the third embodiment. As described later, in the calculation process of the luminal structure information, a three-dimensional position of a distal end section 11 and a three-dimensional position of a characteristic point are estimated. Therefore, on the basis of a result of the estimation, a distance from the distal end section 11 to a given pixel on the captured image can be decided. Furthermore, the analyzability determination section 37 may calculate the distance information on the basis of brightness of the captured image. In such case, it is determined that a bright region corresponds to the close distance, and a dark region corresponds to the long distance.

Note that, because the luminal information is lost in the region where the obstacle exists, the analyzability determination section 37 determines such region as the second unanalyzable region.

Furthermore, the analyzability determination section 37 determines analyzability on the basis of an imaging angle of the subject. The imaging angle here represents an angle formed between a straight line connecting the distal end section 11 and the subject, and a normal line direction of a subject surface. For example, when a distal end of an insertion section and the subject are opposed to each other, the imaging angle becomes a small value close to 0°. On the other hand, when an optical axis has a direction along a longitudinal direction of the lumen, the imaging angle of a lumen inner wall becomes a value lager to some extent than 0°. When the imaging angle is large, the subject is imaged from a diagonal direction. Therefore, the size on the image of the subject becomes extremely small, and there is a fear that information such as minute structure is lost.

The analyzability determination section 37 may acquire results of the calculation process of the luminal structure information, for example, to calculate the imaging angle of each subject in the captured image. In such case, the analyzability determination section 37 determines that a region having an imaging angle equal to or larger than a given angle threshold value is the unanalyzable region. Alternatively, the analyzability determination section 37 may determine the imaging angle on the basis of the distance information. For example, when the imaging angle is large, a distance to the subject significantly changes within a small range on the image. Therefore, the analyzability determination section 37 determines a degree of change of the distance information in a given region containing a processing target pixel. When the degree of change is large, the analyzability determination section 37 may determine that the imaging angle is large. The distance information can be calculated on the basis of various types of information such as brightness of the captured image. For example, the analyzability determination section 37 may divide the captured image into a plurality of regions, and obtain the imaging angle on the basis of brightness distribution of each region.

Note that the analyzability determination section 37 determines a region having a large imaging angle as the first unanalyzable region.

Hereinabove, as determination criteria for image quality, the brightness, the degree of obstruction, and the imaging angle are described. In S22 of FIG. 13, the analyzability determination section 37 may perform determination using all of these criteria. For example, the analyzability determination section 37 determines that the region determined to be unanalyzable under at least one criterion of the brightness, the degree of obstruction, and the imaging angle is the unanalyzable region. However, the analyzability determination section 37 may perform analyzability determination using some of the determination criteria of the brightness, the degree of obstruction, and the imaging angle.

Next, the analyzability determination section 37 detects presence or absence of the hidden portion to perform analyzability determination (S23). FIG. 14 illustrates an example of the captured image when ridges are present. As illustrated in FIG. 14, when there is a hidden portion, like ridges, not imaged due to the surface structure of the intestinal tract, a portion SA where illumination light does not reach and dark shadow is formed is imaged. The dark shadow portion SA has brightness stepwisely becoming lower compared with another portion. Therefore, when a difference in luminance between adjacent pixels or adjacent pixel regions is equal to or larger than a predetermined luminance value, the analyzability determination section 37 determines that there is a hidden portion. For example, the analyzability determination section 37 determines that a given region containing the dark shadow portion SA is the unanalyzable region.

More specifically, the analyzability determination section 37 acquires information indicating brightness of the captured image. The information indicating brightness is the above-described luminance, for example. Then, when a difference in luminance between adjacent two pixels is equal to or larger than a predetermined value or a dark streaky portion exists within a predetermined pixel region in the image, the analyzability determination section 37 determines the target region as the unanalyzable region.

Alternatively, the analyzability determination section 37 may acquire the distance information using a distance sensor or the like. In such case, when a difference in distance between the adjacent two pixels is equal to or larger than a predetermined value or a portion where changes in distance are not successive, the analyzability determination section 37 determines the target region as the unanalyzable region.

Note that the analyzability determination section 37 determines that the region where a hidden portion due to ridges or the like is determined to exist is the second unanalyzable region.

Next, the analyzability determination section 37 performs analyzability determination on the basis of a region size (S24). Through the processes of steps S22 and S23, a determination result is acquired as to each pixel of the captured image, the determination result being either one of being analyzable and being unanalyzable. The analyzability determination section 37 sets the successive pixels determined to be analyzable as one analyzable region. Similarly, the analyzability determination section 37 sets the successive pixels determined to be unanalyzable as one unanalyzable region.

When the size of the unanalyzable region is equal to or smaller than a given threshold value, the analyzability determination section 37 changes the analyzable region to the unanalyzable region. The size here is a size on the image, for example, and may be an area. The area on the image is, for example, a total number of pixels contained in a targeted region. Even when there is no problem in the image quality, in a case where the area on the image in the targeted region is extremely small, the region of interest is not imaged with a sufficient size, resulting in difficulty in appropriate analysis. Accordingly, by eliminating the region whose area is equal to or smaller than a predetermined area, analyzability can be determined appropriately. Note that even if the area is larger than a size threshold value, a region extremely long longitudinally or transversely is also difficult to be analyzed appropriately. Accordingly, the analyzability determination section 37 may change an analyzable region to an unanalyzable region when at least one of the following conditions is satisfied: the longitudinal length of the analyzable region is equal to or shorter than a given length; and the transverse length is equal to or shorter than a predetermined length. Furthermore, the analyzability determination section 37 may perform a process of converting the size on the image into the actual size and determine analyzability on the basis of the converted size.

Note that the analyzability determination section 37 determines that a region changed to the unanalyzable region due to its small size is the first unanalyzable region.

Next, the analyzability determination section 37 performs determination whether or not an analysis is executed by the user (S25). A case where the analysis is not executed by the user corresponds to a case where, for example, the endoscope system 1 includes the analysis section 36 described above and the analysis is performed by the analysis section 36. However, the analysis section 36 may be provided outside the endoscope system 1.

When the analysis section 36 is omitted and the user conducts the analysis (Yes in S25), the analyzability determination section 37 determines analyzability on the basis of stability of the image (S26). The stability of the image here represents a degree of motion of the subject between the images captured in time series. The motion includes parallel movement, rotation, and vibration, and is generated by relative movement between the distal end section 11 and the subject. It is assumed that the user determines presence or absence of the region of interest or a degree of malignancy while watching a movie/image. Therefore, even when the captured image in a given frame contains a region determined to be analyzable on the basis of its image quality or a region size, in a case where the stability of the image in a period including the given frame is low, the state of the subject on the image drastically changes, and the analysis by the user becomes difficult. Accordingly, the analyzability determination section 37 determines the stability of the image on the basis of the time-series images containing the captured image as a processing target. When the motion is equal to or larger than a predetermined motion, the analyzability determination section 37 changes the analyzable region contained in the captured image as the processing target to the unanalyzable region. Note that the analyzability determination section 37 may perform determination as to respective motion amounts of parallel movement, rotation, and vibration, or may obtain an integrated motion amount of the parallel movement, the rotation, and the vibration to compare the obtained motion amount with a threshold value. Note that various methods such as a motion vector and an optical flow are known as the method of obtaining the motion amount, and the various methods are widely applicable in the present embodiment. The degree of the motion amount may be determined by an actual dimension or an apparent size on the captured image.

Note that the analyzability determination section 37 determines that a region determined to be the unanalyzable region due to its large motion is the first unanalyzable region.

On the other hand, when the user does not perform the analysis (No in S25), an appropriate analysis is also possible in a case where stability of the image is low. Accordingly, the analyzability determination section 37 omits the process of step S26.

As described above, the endoscope system 1 includes the analyzability determination section 37 that determines whether or not an analysis based on the captured image is possible on the basis of the captured image. This configuration makes is possible to appropriately determine whether or not the lumen has been imaged in an analyzable state.

As described above, the analyzability determination section 37 may output analyzability information on the basis of a degree of motion of the subject in the captured image. As a result, when there is a fear that the user cannot observe the subject on the image due to a large motion, for example, the subject is determined to be unanalyzable. For example, when there is a subject imaged with high image quality but the subject is constantly moving in a movie, the subject can be determined to be inappropriate for analysis.

Furthermore, the analyzability determination section 37 determines the analyzability information on the basis of the image quality of the captured image. As a result, when the analysis cannot be performed due to low image quality, determination can be made that there is a fear of missing.

Furthermore, the analyzability determination section 37 may divide the captured image into a plurality regions on the basis of a given criterion, and then output analyzability information in the respective regions on the basis of respective sizes of the plurality of regions. The given criterion here is image quality, for example, as described above. Furthermore, the plurality of regions is analyzable regions or unanalyzable regions. One analyzable region is constituted by successive pixels determined to be analyzable. As a result, it is possible to prevent a region which is small in such a degree that is not appropriate for analysis from being determined as the analyzable region.

Furthermore, the control section 33 may control the turning mechanism 18 and the advancing/retreating mechanism 17 on the basis of the analyzability information. For example, when the unanalyzable region is detected in some regions or all regions of the first captured image, especially in a lower region in C3 of FIG. 9B, the control section 33 performs a control of reducing a movement speed or a movement amount of the advancing/retreating mechanism 17. In such case, compared with the example illustrated in FIG. 9B, an imaging range C4 corresponding to a second imaging region is shifted toward the upper side. This enables a control of facilitating overlapping of the analyzable regions corresponding to two captured images. That is, it is possible to image the lumen exhaustively in an analyzable state.

Furthermore, the control section 33 may perform a re-scan when determination is made that there is a portion where an analysis by the analysis section 36 is not possible in a portion where a scan has been performed of the lumen. The re-scan here may be, as described above, imaging the same portion by suppressing the extraction amount of the insertion section 2b or imaging the same portion by distally re-inserting the insertion section 2b. As a result, it is possible to prevent generation of the unanalyzable portion and accordingly missing can be suppressed.

In execution of the re-scan, the control section may perform a control of changing scanning conditions. Specifically, the control section 33 performs the re-scan using scanning conditions different from scanning conditions used when the captured image determined to be unanalyzable has been captured. The scanning conditions here include a condition regarding motion of the distal end section 11 in the scan, a condition regarding a light source or an optical system in capturing of the captured images, and a condition of image processing performed to the captured image.

As described above, it is considered that the unanalyzable portion exists because the image quality or the motion amount in imaging is not appropriate, or the targeted portion has structure that generates a hidden portion such as ridges. Accordingly, when the re-scan is performed without changing the scanning conditions, there is a fear that the unanalyzable portion is generated also in the re-scan. By changing the scanning conditions, it is possible to suppress generation of the unanalyzable portion.

Specifically, the control section 33 executes, as the control of changing the scanning conditions, at least one control selected from: a control of performing insufflation of injecting gas to the lumen and degassing of releasing the gas from the lumen; a control of eliminating an obstacle inside the lumen; and a control of changing a motion of the field of the field of view by at least one of the turning mechanism 18 and the advancing/retreating mechanism 17.

By performing the insufflation or the degassing, for example, it is possible to release a state where ridges are folded. Accordingly, the insufflation or degassing enables imaging of the hidden portion. Alternatively, by eliminating the obstacle, a subject existing behind the obstacle can be imaged. The obstacle may be eliminated through cleaning by water sending or through suction. Furthermore, the obstacle adheres not to the wall surface of the lumen but to the distal end section 11 in some cases. Also in such cases, elimination through water sending or suction is possible.

Furthermore, the control section changes the imaging angle or the distance to the lumen by changing motion of the field of view. As a result, the subject can be imaged in a focused state from a position close to a front surface, and it also becomes possible to ensure sufficient resolution. For example, the control section 33 may adjust a rotation axis by moving the insertion section 2b in a direction orthogonal to a reference axis AX1. Alternatively, the control section 33 may perform a control of changing a radius of rotation by changing a curving degree of a curving section 12. Alternatively, the control section 33 may acquire distance information between the distal end section 11 and the lumen and dynamically changes the radius of rotation in accordance with the distance information to perform a scan following the surface of the intestinal tract. The distance information may be acquired by an arbitrary method, such as a distance sensor. Note that in a case of performing the scan following the surface of the intestinal tract, it is required to acquire the distance information and control the curving section 12 in accordance with the distance information. Therefore, it is desirable to make the rotation speed small for enhancing followability. Furthermore, it is also possible to adjust brightness of the captured image by changing the imaging angle or the distance to the lumen.

Furthermore, the control section 33 may control light quantity of the light source section for improving image quality, control an output level in an auto gain control (AGC) to an image signal, or control parameters of image processing such as noise reduction.

Furthermore, the control section 33 may switch controls depending on whether the unanalyzable portion is within a range to be imaged from now. The range to be imaged from now is specifically a range positioned at an anus side from a current position of the distal end section 11. For example, the control section 33 determines, on the basis of information indicating a control history of the advancing/retreating mechanism 17, whether the targeted unanalyzable portion is positioned on a proximal side or a distal side relative to the current position of the distal end section 11. The information indicating the control history is, for example, time-series output of an encoder included in a driving section that drives the advancing/retreating mechanism 17. The unanalyzable portion out of the range to be imaged from now is a portion highly possibly missed as it is, and therefore hereinafter described as a missed portion.

Even when the third unanalyzable portion exists in the range to be imaged from now, the portion is simply not subjected to imaging yet, and the portion is possibly imaged in an analyzable state by continuing the scan. Accordingly, the necessity of changing the scanning conditions is low for the third unanalyzable portion. It is sufficient to begin with an attempt to image by normal scan. Furthermore, as for the first and second unanalyzable portions existing within the range to be imaged from now, probability of coming into the field of view is high even when the scanning conditions are not changed. However, as described above, the first and second unanalyzable portions are portions coming into the field of view but not clearly imaged on the captured image. Therefore, the control section 33 changes the scanning conditions in consideration of a factor why the portion is determined to be unanalyzable.

Furthermore, as for the first to third unanalyzable portions out of the range to be imaged, there is a possibility that a control different from the normal scan, i.e., distal insertion becomes necessary. Accordingly, the control section 33 performs a control of inserting the insertion section 2b, and further changes the scanning conditions, and then execute the re-scan. Note that the control of inserting the insertion section 2b may be a control of automatically inserting the insertion section 2b using the turning mechanism 18 or the advancing/retreating mechanism 17, or may be a presentation control or the like of requiring the user to perform insertion.

4. Third Embodiment

Moreover, the endoscope system 1 may also obtain luminal structure information indicating the luminal structure. The following is a detailed description of a process of obtaining the luminal structure information. The following also describes a method of associating the luminal structure information with the analyzability information described above in the second embodiment.

4.1 Process of Obtaining Luminal Structure Information

Figure 15:
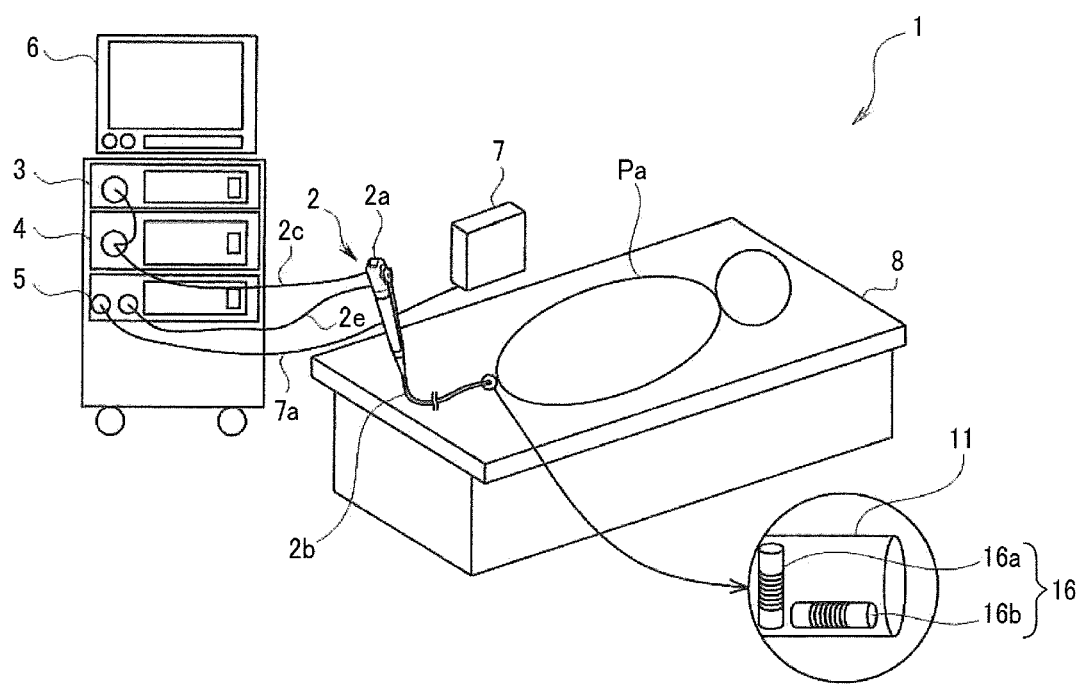
FIG. 15 illustrates another example configuration of the endoscope system.

FIG. 15 illustrates a configuration of the endoscope system 1 of the present embodiment. In addition to the configuration shown in FIG. 1, the endoscope system 1 may also include a luminal structure detection device 5 and a magnetic field generating device 7.

A magnetic sensor 16 is disposed in the distal end section 11 of the insertion section 2b. Specifically, the magnetic sensor 16 is a detection device disposed in the vicinity of the image sensor 15 of the distal end section 11 to detect the position and orientation of the point-of-view of the image sensor 15. The magnetic sensor 16 has two coils 16a and 16b. For example, the two central axes of the two cylindrical coils 16a and 16b are orthogonal to each other. Thus, the magnetic sensor 16 is a 6-axis sensor that detects the position coordinates and the orientation of the distal end section 11. The orientation herein refers to the Euler angle.

A signal line 2e of the magnetic sensor 16 extends from the endoscope 2 and is connected to the luminal structure detection device 5.

The magnetic field generating device 7 generates a predetermined magnetic field, and the magnetic sensor 16 detects the magnetic field generated by the magnetic field generating device 7. The magnetic field generating device 7 is connected to the luminal structure detection device 5 by a signal line 7a. The magnetic field detection signal is supplied from the endoscope 2 via the signal line 2e to the luminal structure detection device 5. Instead of the magnetic sensor 16, a magnetic field generating element may be provided in the distal end section 11, and instead of the magnetic field generating device 7, a magnetic sensor may be provided outside the patient Pa to detect the position and orientation of the distal end section 11. Herein, the magnetic sensor 16 detects, in real time, the position and orientation of the distal end section 11, in other words, the position and orientation of the point-of-view of the image captured by the image sensor 15.

Figure 16:
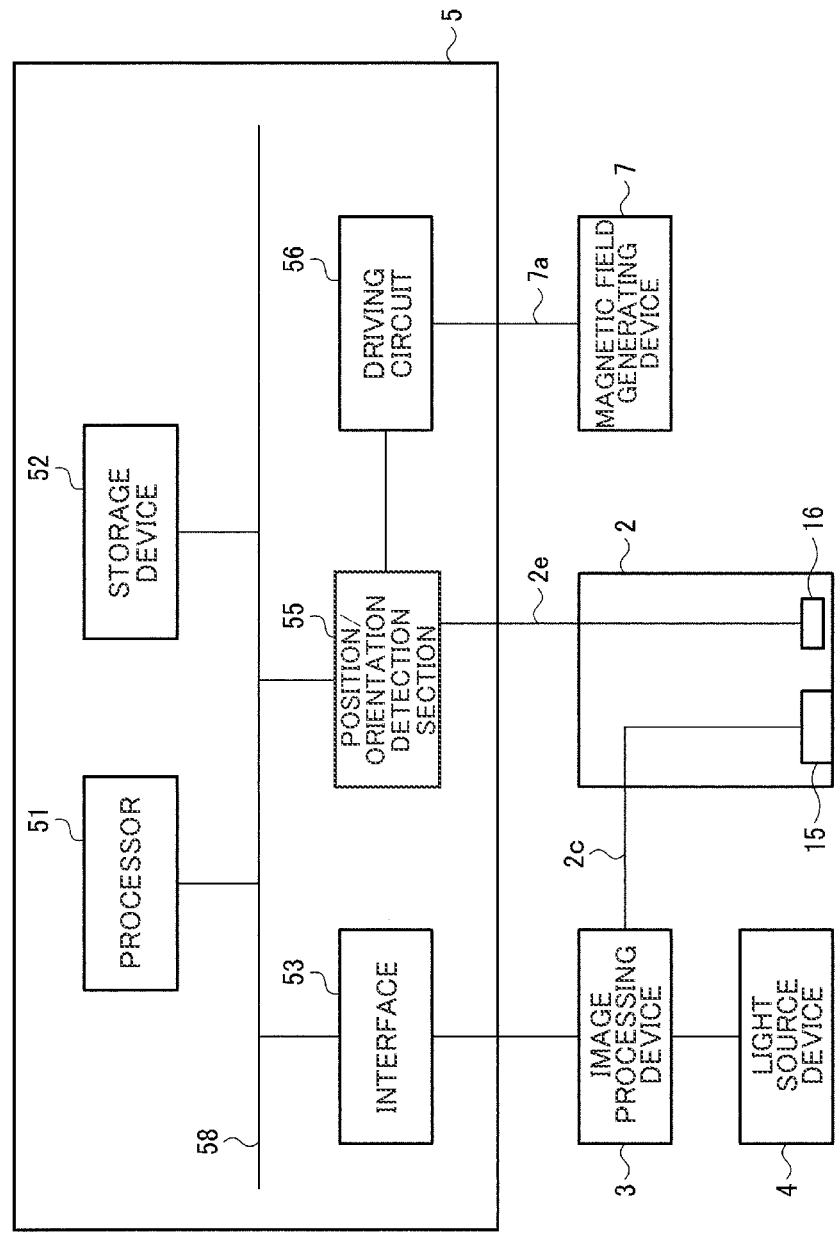
FIG. 16 illustrates an example configuration of a luminal structure detection device.

FIG. 16 shows an example configuration of the luminal structure detection device 5. The luminal structure detection device 5 includes a processor 51, a storage device 52, an interface 53, a position/orientation detection section 55, and a drive circuit 56. Each section of the luminal structure detection device 5 are connected to each other by a bus 58.

The processor 51 is a control section having a CPU and a memory. The processor 51 controls processing of each section in the luminal structure detection device 5. The memory is a storage section including ROM, RAM, and the like. The ROM stores various processing programs to be executed by the CPU, as well as various types of data. The CPU is capable of reading out and executing various programs stored in the ROM and the storage device 52.

The storage device 52 stores the luminal structure calculation program. The luminal structure calculation program is a software program that calculates the luminal structure information from the information of position and orientation of the distal end section 11 and the captured images. When the CPU reads out and executes the luminal structure calculation program, the processor 51 constitutes a luminal structure calculation section that calculates the three-dimensional structure of the lumen based on the image captured by the image sensor 15 and the three-dimensional arrangement of the distal end section 11 detected by the magnetic sensor 16.

The interface 53 outputs the luminal structure information calculated by the processor 51 to the image processing device 3. The interface 53 is, for example, a communication interface that performs communication with the image processing device 3.

The interface 53 may also serve as an image capturing section. The image capturing section is a processing section that captures an image obtained in the processing device 3 at a certain period. For example, thirty captured images per second, which is equal to the frame rate, are acquired from the image processing device 3 through the endoscope 2. Although the image capturing section herein captures the thirty images per second, it is also possible to capture the images at a period longer than the frame rate. For example, the image capturing section may capture, for example, three images per second.

The position/orientation detection section 55 controls the drive circuit 56 that drives the magnetic field generating device 7 to enable the magnetic field generating device 7 to generate a predetermined magnetic field. The position/orientation detection section 55 detects the magnetic field with the magnetic sensor 16, and generates data of the position coordinates (x, y, z) and the orientation (vx, vy, vz) of the image sensor 15 from the detected magnetic field detection signal. The orientation refers to the Euler angle. That is, the position/orientation detection section 55 is a detection device that detects the position and orientation of the image sensor 15 based on the detection signal from the magnetic sensor 16.

Figure 17:
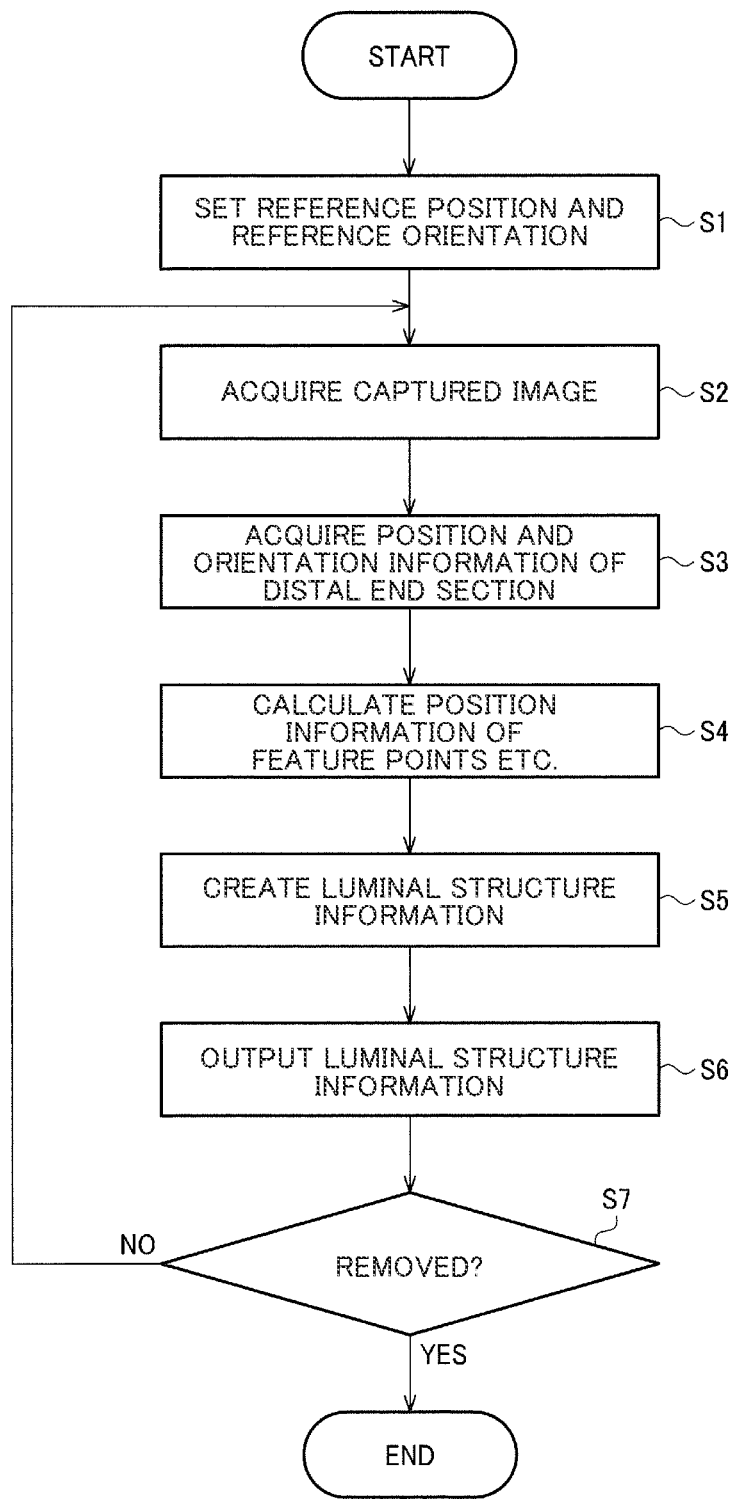
FIG. 17 is a flowchart illustrating a process of acquiring luminal structure information.

FIG. 17 is a flowchart of an example of a flow of the luminal structure calculation process. First, the physician performs a predetermined operation on an input device (not shown) with the distal end section 11 of the insertion section 2b positioned in the anus. Based on the operation, the processor 51 sets the position and orientation data from the position/orientation detection section 55 as the reference position and the reference orientation of the distal end section 11 when calculating the luminal structure (S1). For example, with the distal end section 11 placed on the anus, the physician sets the reference position and the reference orientation of the distal end section 11 in the position of the anus in the three-dimensional space as the initial value. The luminal structure calculated in the process below is determined based on the reference position and the reference orientation set herein.

After setting the reference position and the reference orientation, the physician inserts the distal end section 11 to the innermost part of the large intestine. With the distal end section 11 of the insertion section 2b at the innermost part of the large intestine, the physician sends air to expand the large intestine and moves the insertion section 2b toward the anus by pulling it, and curves the curving section 12 in various directions to observe the inner wall of the large intestine while, for example, stopping pulling the insertion section 2b on the way. The luminal structure of the large intestine is calculated while the physician is observing the inner wall of the large intestine.

The interface 53, which serves as the image capturing section, acquires an image at every predetermined period Δt from the captured images supplied every ⅟30 second from the image processing device 3 (S2). The period Δt is, for example, 0.5 seconds. The CPU acquires information of the position and orientation of the distal end section 11 output by the position/orientation detection section 55 upon the acquisition of the captured image (S3).

The processor 51 calculates the position information of a plurality of feature points, etc. in the three-dimensional space, in an image acquired in S2 and one or more previously-acquired images (S4). The set of the position information of a plurality of feature points, etc. determined by the calculation corresponds to the information of the luminal structure. As described below, the position information of each feature point may be calculated from the image information using SLAM (Simultaneous Localization and Mapping), SfM (Structure From Motion), or like methods, or using the triangulation principles. The method for calculating the position of each feature point is described later.

When the first image is acquired, since there are no previously-acquired images, the step S4 is not performed until a predetermined number of images are acquired.

The processor 51 creates or updates the luminal structure information by adding the calculated position information of a plurality of feature points, etc. (S5).

Figure 18:
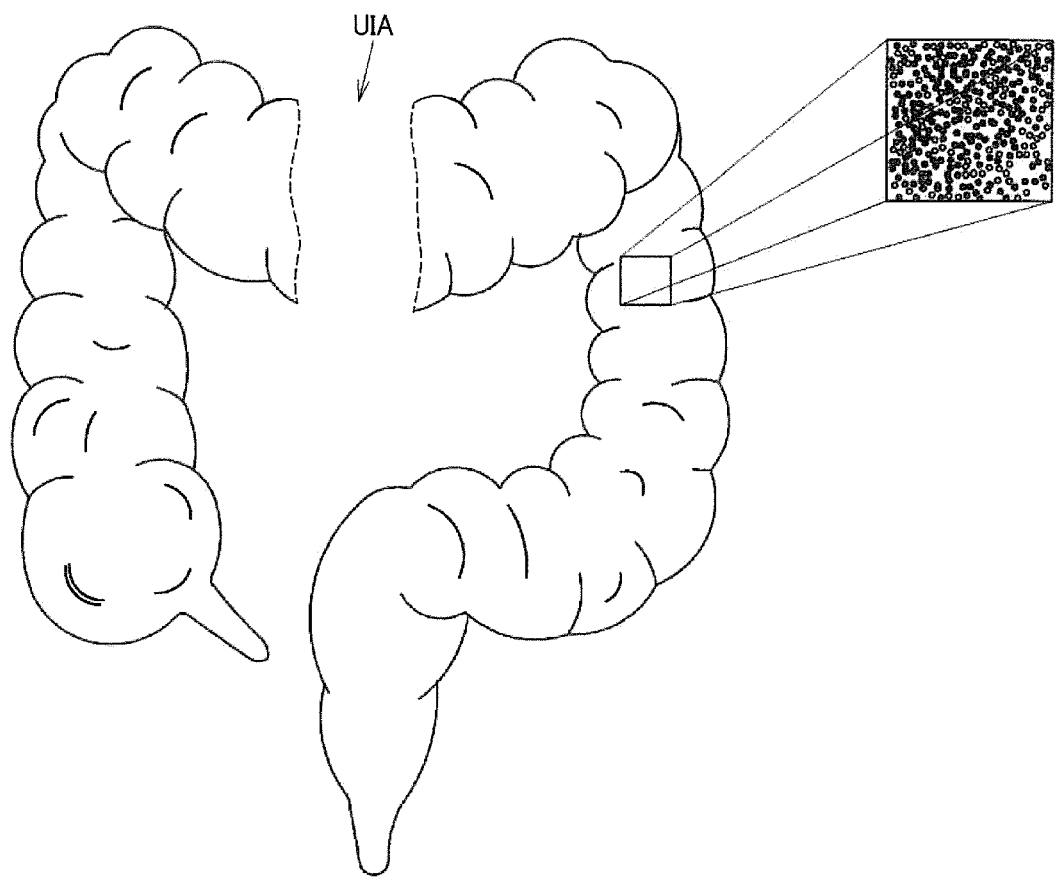
FIG. 18 illustrates an example of the luminal structure information.

FIG. 18 illustrates an example of the luminal structure information. The luminal structure information created in S5 includes a set of one or more feature points, etc. in the region observed by the endoscope 2. The luminal structure information is 3D data. FIG. 18 is an image of the luminal structure information viewed from a given point-of-view. For example, when the luminal structure information is displayed, the user can input instructions to change the point-of-view position, thereby viewing the luminal structure from a desired direction among 360 degree.

FIG. 18 shows an example of the luminal structure information that even takes into account the unevenness in the lumen. However, the luminal structure information may be more simplified. For example, the luminal structure information may be a cylinder model. By assuming that the lumen has a cylindrical shape, the processing load can be reduced. For example, as described later, in an embodiment in which a sensor, such as the magnetic sensor 16, is not used, the effect of reducing the calculation amount by assuming a cylindrical lumen is significant. For simplification, it is also possible to assume a straight lumen with no bends or only simple bends, or a structural model with differences only in size, such as the length and the diameter for each part, from a standard luminal structure.

The interface 53 of the luminal structure detection device 5 outputs the generated luminal structure information to the image processing device 3 (S6). In S6, the interface 53 may also control the display of the luminal structure information on the monitor 6. Next, the processor 51 determines whether or not the insertion section 2b has been removed from the patient (S7). For example, when the insertion section 2b has been removed, the user performs user input indicating the end of observation using an input device (not shown). The processor 51 performs the determination shown in S7 based on the user input. If the removal has not been done (No in S7), the process returns to S2.

There are various methods for calculating the position of the feature point, etc. in S4. Several methods are described below. The processor 51 may use SLAM, SfM, or similar methods to calculate the positions of the feature points on a plurality of consecutive images.

In the generation of luminal structure information, it is possible to apply a bundle adjustment that optimizes the internal parameter, external parameter and world coordinate point group from images using a nonlinear least squares method. For example, using each of the presumed parameters, the world coordinate points of the plurality of feature points thus extracted are subjected to perspective projective transformation, thereby obtaining each parameter and each world coordinate point group with minimum reprojection error.

The external parameters for the distal end section 11 are calculated by solving the 5-point and 8-point algorithms. The position of the feature point is calculated according to the position of the distal end section 11 using the triangulation method. The error E between the coordinates of the 3D point projected on the image plane and the feature point due to the reprojection error is expressed by the following equation (3).

[Math. 1]

$$E = \sum_{i=1}^{K} \sum_{j=1}^{L} \|P_i - P_{sj}\|^2 \quad (3)$$

wherein L is the number of the feature points on K images, Psj is the coordinate position of the 3D point Pi presumed by the parameter of the distal end section 11 with triangulation on the image plane, and Pi is the coordinate position of the corresponding feature point on the image.

The position coordinates of the distal end section 11 is calculated using the LM (Levenberg-Marquardt) method so that the function of the error E in equation (3) is minimized.

Figure 19:
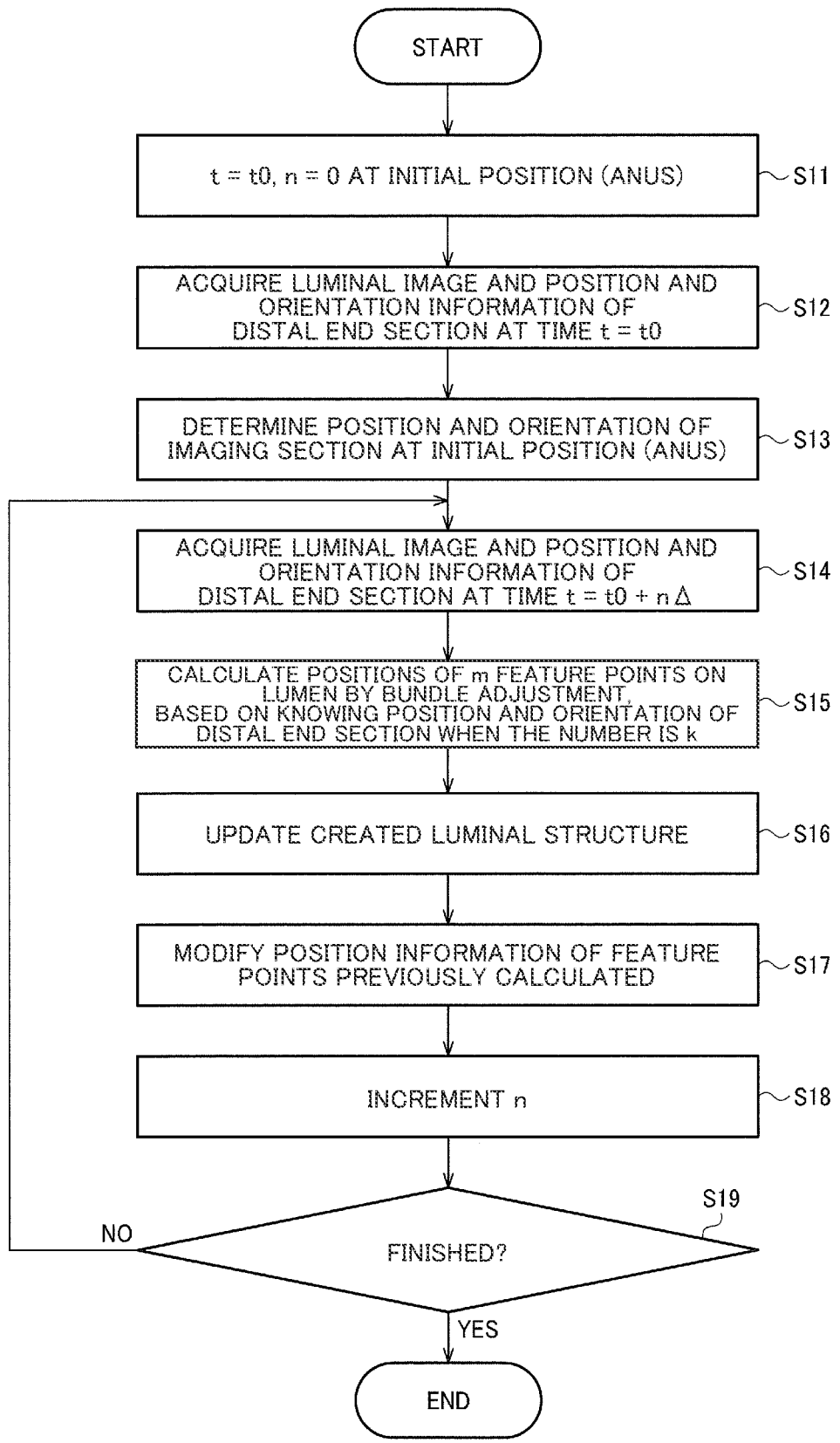
FIG. 19 is a flowchart illustrating a process of acquiring the luminal structure information using bundle adjustment.

FIG. 19 is a flowchart of a method of performing the calculation of the position of each feature point in the three-dimensional space using a bundle adjustment. When the anal position is set to the initial position, the processor 51 sets time t to t0, and sets the software counter value n to 0 (S11).

The processor 51 acquires a captured image at time t0 and the information of position and orientation of the distal end section 11 (S12). The captured image is acquired from the image processing device 3. The information of position and orientation of the distal end section 11 is acquired from the position/orientation detection section 55.

The processor 51 determines the position and orientation of the distal end section 11 at the initial position, i.e., at the anal position (S13). For example, the anal position (x, y, z) is determined to be (0,0,0) and the orientation (vx, vy, vz) is determined to be (0,1,0). S11 and S13 correspond to S1 in FIG. 17.

The processor 51 acquires a captured image at time (t0+nΔt) and the information of position and orientation of the distal end section 11 (S14). S12 and S14 correspond to S2 in FIG. 17. The information of the position and orientation of the distal end section 11 may be modified. For example, using the Kalman filter, the path in which the distal end section 11 passes in the past is modified, and the position of the distal end section 11 in the past is modified based on the modified path.

When n becomes k, the processor 51 extracts a plurality of feature points in each captured image, and calculates the positions of m feature points in the obtained captured image by the bundle adjustment described above using the known positions and orientations of the distal end section 11, i.e., the known three-dimensional arrangements of the distal end section 11, at k time points (S15).

Figure 20:
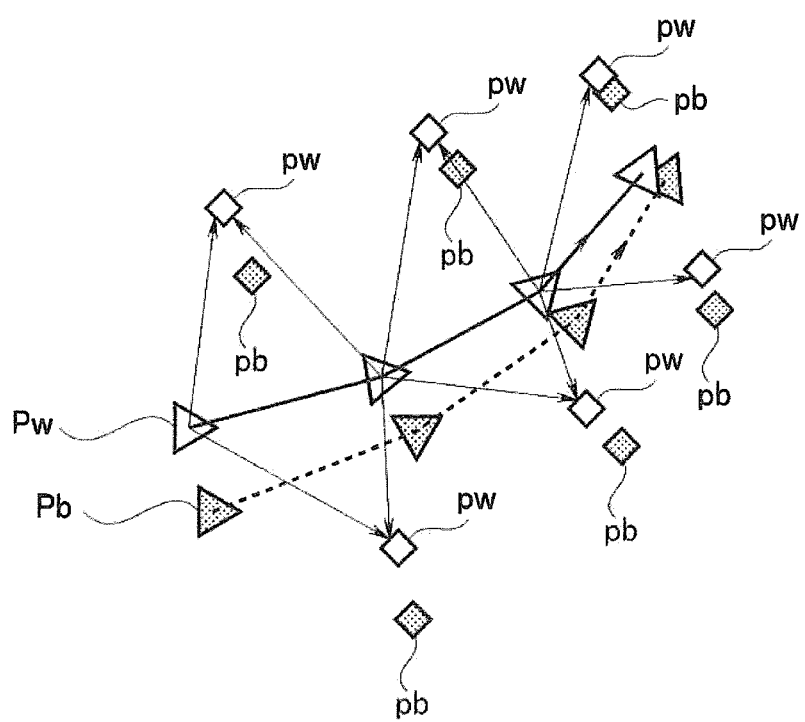
FIG. 20 is a schematic diagram illustrating relationship between a plurality of feature points and a position and orientation of the distal end section.

FIG. 20 is a schematic diagram illustrating relationship between feature points on a plurality of images consecutively acquired and the position and orientation of the distal end section 11. In FIG. 20, white triangle Pw represents the actual position and orientation of the distal end section 11, and the black triangle Pb represents the presumed position and orientation of the distal end section 11. It is shown that the distal end section 11 actually moved along the solid line. The presumed distal end section 11 moved along the dotted line. As the time passed, the position of the distal end section 11 moved and the orientation of the distal end section 11 changed.

Further, in FIG. 20, the white rectangle pw represents the actual position of the feature point, and the black rectangle pb represents the presumed position, i.e., the calculated position of the feature point. The feature point is, for example, a location in the captured image with a characteristic shape or color and thus is easy to identify or track.

To obtain the three-dimensional luminal structure of the large intestine, the coordinates of a plurality of feature points on the inner wall of the intestinal tract of the large intestine are determined, and a three-dimensional model is generated by the set of the plurality of coordinates thus determined or by connecting the coordinates. That is, the three-dimensional structure of the lumen is determined from the calculated position of each feature point in the three-dimensional space.

In FIG. 20, since the information of the position and orientation of the distal end section 11 at each time point contains information of 6 axes, the information of the position and orientation of the distal end section 11 at k time points contains 6 k pieces of information. Since the position of each feature point contains information of 3 axes, the information of the position of m feature points contains 3 m pieces of information. Accordingly, when using SLAM, SfM, or similar methods, the number of parameters to be determined is (6 k+3 m).

In the method of the present embodiment, as described above, the magnetic sensor 16 is provided in the distal end section 11 of the endoscope 2, and the luminal structure detection device 5 may include the position/orientation detection section 55 that obtains the position and orientation information detected by the magnetic sensor 16. In this case, the 6 k parameters corresponding to the positions and orientations of the distal end section 11 are known parameters. Since the optimization calculation by the processor 51 is limited to the calculation of 3 m parameters, it is possible to reduce the amount of processing for the optimization calculations. Therefore, the processing can be accelerated. The reduction in the number of parameters also suppresses the accumulation of detection errors, thereby preventing an increase in error in the position of the generated three-dimensional model.

Further, even if the distal end section 11 of the insertion section 2b of the endoscope 2 is pressed against the inner wall of the lumen or immersed in dirty cleaning water, or even if continuous images cannot be properly captured due to blurred image or the like, the information of the position and orientation of the distal end section 11 can be obtained. Therefore, even if consecutive images were not successfully obtained in some cases, the calculation of the 3 m parameters is likely to succeed. As a result, the robustness of the calculation of the luminal structure increases.

The explanation continues below with reference back to FIG. 19. The processor 51 updates the luminal structure information by adding the newly calculated position information of the feature point to the luminal structure information already created (S16). S16 corresponds to S5 in FIG. 17.

The processor 51 modifies the position information of feature point that was previously calculated (S17). Among the 3 m feature points obtained by the new calculation, the position information of feature point calculated in the past is modified using the position information newly calculated, for example, by the calculation of average value. The process in S17 does not have to be performed; instead, the position information of each feature point calculated in the past may be updated by the newly calculated position information of the feature point.

After S17, the processor 51 increments n by 1 (S18) and determines whether or not a command of end of inspection has been entered (S19). The command of end of inspection is, for example, a predetermined command that is input to the input device by the physician, for example, after the insertion section 2b has been removed from the large intestine. If the command is entered (YES in S19), the process ends.

If the command of end of inspection is not entered (NO in S19), the process goes to S14. As a result, the processor 51 acquires a captured image after period Δt from the last acquisition time of captured image (S14), and executes the processes in S14 onward.

By performing these processes, the luminal structure information is output. The lumen in the present embodiment is presumably a continuous curved surface with no holes, etc., except at the ends. Therefore, the distance between a given feature point and a feature point nearby is expected to be somewhat small in the luminal structure information to be obtained. If there is a portion with a coarse feature point, for example, a portion where each feature point is equal to or less than a predetermined threshold in a relatively wide range, the portion can be determined as a unanalyzable portion. More specifically, the portion is determined to be the third unanalyzable portion described above, among the unanalyzable portions. During the observation of the large intestine, the insertion section 2b is first inserted deep inside; then, while pulling it out, the luminal structure information is generated. Therefore, the portion closer to the anal side than the site currently under observation is basically determined to be the third unanalyzable portion.

The unanalyzable portion herein corresponds to, for example, UTA in FIG. 18. FIG. 18 shows an example in which the luminal structure information is split into two parts because of the presence of the unanalyzable portion. If the structure includes a sensor to detect the position and orientation of the distal end section 11 of the insertion section 2b, even when the luminal structure information is split as described above, the positional relationship of the plurality pieces of divided luminal structure information can be identified. That is, even when the luminal structure information is split, it is possible to presume the entire luminal structure.

If the position and orientation can be detected using sensors, the process of obtaining the luminal structure information is not limited to the bundle adjustment. For example, the processor 51 may obtain the luminal structure information from two images using triangulation. Specifically, the processor 51 calculates the positions of the feature points using triangulation from the information of the position and orientation of the distal end section 11 and two captured images. That is, the three-dimensional structure of the lumen is determined from the information of the position and orientation of the image sensor 15 and the position information of pixels in the three-dimensional space calculated based on triangulation from the position information of pixels of the feature points in the two images captured by the image sensor 15.

The triangulation may be performed based on two captured images obtained at two different times, or based on two captured images obtained at the same time using a stereo camera.

Further, the processor 51 may calculate the position of each feature point using photometric stereo images. In this case, the distal end section 11 of the insertion section 2b have a plurality of lighting windows. The multiple illumination lights from the plurality of lighting windows can be switched and selectively emitted by controlling the drive of a plurality of light-emitting diodes for illumination provided in the light source device 4.

The shadow portion in the image of the surface of the subject changes its state by switching the illumination light. Therefore, based on the amount of change, the distance to the shadow portion on the surface of the subject can be calculated. In other words, the three-dimensional structure of the lumen can be determined based on the photometric stereo from the image of the shadow region in the captured image obtained by illumination with the plurality of illumination sections that are operated selectively.

Further, the processor 51 may use a distance sensor to calculate the luminal structure. The distance sensor is a sensor that detects a distance image, for example, by way of TOF (Time Of Flight). The distance sensor measures the distance by measuring the time of flight of the light. The distance sensor is provided in the distal end section 11 of the insertion section 2b and detects the distance from the distal end section 11 to the inner wall of the lumen for each pixel. The position information of each point on the inner wall of the large intestine, i.e., the three-dimensional structure of the lumen, can be calculated from the distance for each pixel detected by the distance sensor and the position and the orientation of the distal end section 11. The distance sensor may be a sensor of other methods, such as LiDAR (Light Detection and Ranging/Laser Imaging Detection and Ranging). It is also possible to provide an illumination section that emits a predetermined pattern light in the distal end section 11, thus allowing the processor 51 to measure the distance from the distal end section 11 to the inner wall by pattern light projection.

Further, the structure using the position/orientation detection sensor, such as the magnetic sensor 16, for calculating the luminal structure information is not indispensable for the method of the present embodiment. Specifically, the magnetic sensor 16 and the magnetic field generating device 7 shown in FIG. 15 may be omitted.

In this case, the processor 51 calculates the luminal structure information using SLAM, SfM, or similar methods based on a plurality of captured images. For example, the processor 51 performs the process of optimizing (6 k+3 m) parameters, including the position and orientation of the distal end section 11 in the example above.

As shown in FIG. 15 and FIG. 16, the endoscope system 1 of the present embodiment may include a luminal structure information acquisition section. Specifically, the luminal structure information acquisition section corresponds to the processor 51. The luminal structure information acquisition section obtains the luminal structure information that indicates the structure of the lumen based on the captured image. The endoscope system 1 may include the position/orientation detection section 55 that obtains the position and orientation information of the subject light acquisition section 20 with respect to the lumen from the position sensor provided at the distal end of the insertion section 2b that is to be inserted into the lumen. The position sensor is, for example, the magnetic sensor 16. In this case, the luminal structure information acquisition section obtains the luminal structure information that indicates the structure of the lumen based on the position and orientation information and the captured image. In FIG. 15 and FIG. 16, the luminal structure detection device 5 includes the position/orientation detection section 55 and the luminal structure information acquisition section; however, the luminal structure detection device 5 may be provided integrally with the image processing device 3. The luminal structure detection device 5 may partially or entirely be implemented by cloud computing.

Even without obtaining the luminal structure information, it is possible to presume the amount of insertion based on the amount of control of the advancing/retreating mechanism 17 and to presume roughly which part of the lumen is being imaged based on the amount of control of the turning mechanism 18. The amount of control herein means, for example, the output of an encoder. However, since the luminal structure information is obtained based on the captured image, it enables presumption as to which part of the lumen is being imaged and how it is imaged with higher accuracy than when using the encoder output. In particular, by also using the position and orientation information, even if the luminal structure is split into two or more parts as shown in FIG. 18, the positional relationship between the two or more luminal structures can be presumed, thereby presuming the whole structure of the lumen with high accuracy. This makes it possible to appropriately determine whether or not the scanning is being performed properly or set the scanning conditions or the like for re-scanning.

4.2 Association Process

Figure 21:
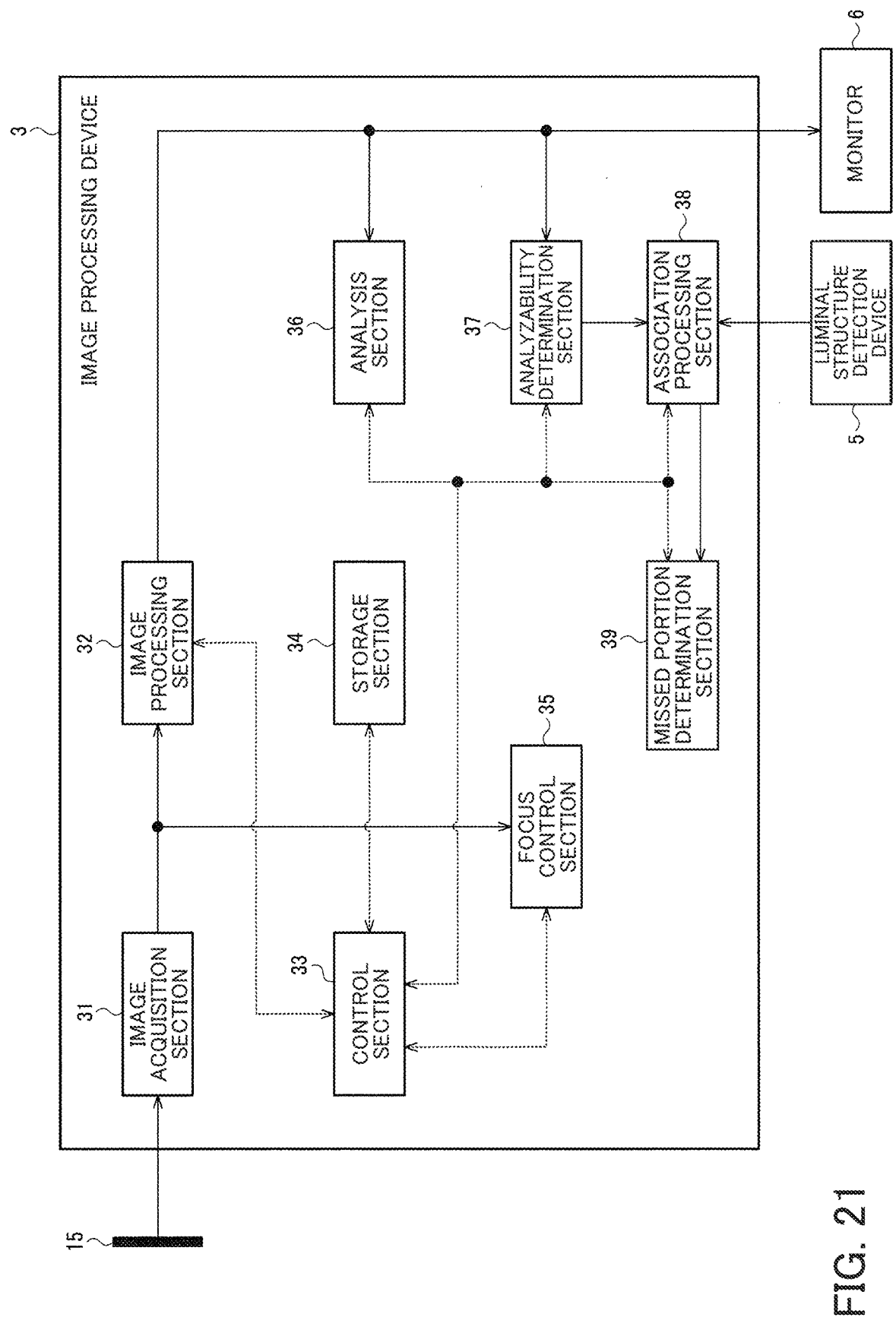
FIG. 21 illustrates another example configuration of the image processing device.

FIG. 21 illustrates a configuration of the image processing device 3 of the present embodiment. As shown in FIG. 21, the image processing device 3 includes, in addition to the structure shown in FIG. 12, an association processing section 38 and a missed portion determination section 39. However, the structure of the image processing device 3 is not limited to that illustrated in FIG. 21, and can be modified in various ways including omitting some of its components or adding other components.

The association processing section 38 performs a process of associating the analyzability information obtained by the analyzability determination section 37 with the luminal structure information. As mentioned above, the determination of analyzability is performed using the captured image. By performing association as to which parts of the luminal structure have the analyzable region or unanalyzable region, it is possible to appropriately determine the portions requiring re-scanning Although it is possible to presume the target portion for re-scanning based on the control history of the turning mechanism 18 and the advancing/retreating mechanism 17, the target portion can be more precisely identified by associating the analyzability information with the luminal structure information. Further, the user may distally insert the insertion section 2b during the re-scanning. In this case, by presenting the association result, the user can easily understand the specific operation for imaging the unanalyzable portion.

In the calculation process of the luminal structure information, the position and orientation of the distal end section 11 and the three-dimensional positions of the feature points in the captured image are presumed. More specifically, when capturing an image using the endoscope 2 and calculating the luminal structure information at the same time, the association of the feature points in the captured image with the luminal structure has already been done.

Therefore, the association processing section 38 performs the process of associating the analyzability information with the luminal structure information by using the results of the calculation process of the luminal structure information. For example, the association processing section 38 can presume the three-dimensional positions of points other than the feature points in the captured image based on the three-dimensional positions of the feature points. Therefore, the analyzable portion of the luminal structure corresponding to the analyzable region is determined by defining the analyzable region of the captured image by using a plurality of points, and presuming the three-dimensional position of the plurality of points. The plurality of points herein are, for example, three or more points set on the outline of the analyzable region.

Alternatively, the plurality of points that define the analyzable region may be the feature points used in the calculation of the luminal structure information. For example, the analyzability determination section 37 may obtain the information of the feature points set for the calculation process of the luminal structure information in advance, and may perform the analyzability determination based on the feature points. For example, the determination based on the image quality in S22 of FIG. 13 may be performed for each region surrounded by three or more feature points. In this way, the three-dimensional positions of the analyzable region and the unanalyzable region can be identified by directly using the information used for the acquisition of the luminal structure information. Specifically, the association processing section 38 sets a plurality of feature points on each of the plurality of images captured at two or more timings. Then, the association processing section 38 associates the analyzability information with the luminal structure by determining the correspondence between the plurality of feature points in the images captured at two or more timings.

Figure 22:
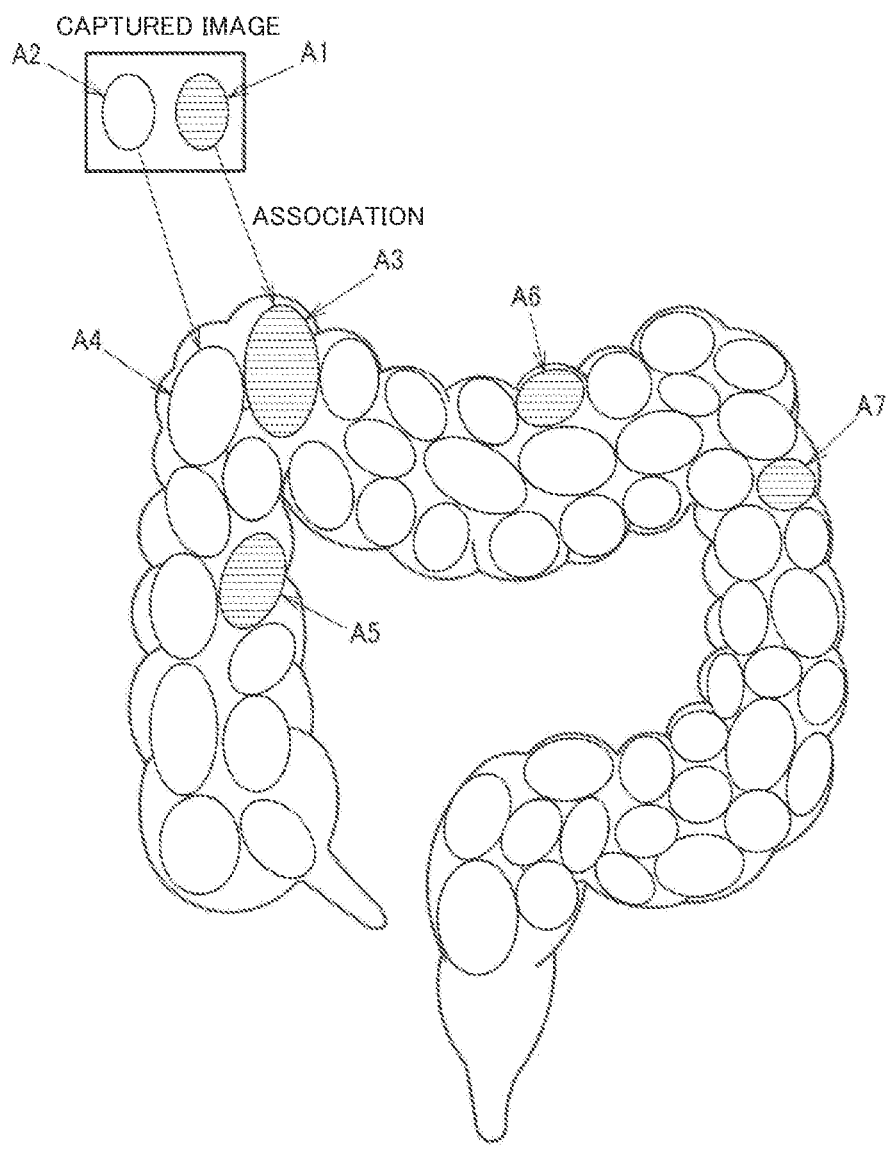
FIG. 22 illustrates an example of association of the analyzability information with the luminal structure information.

FIG. 22 is a schematic diagram illustrating the process of associating the analyzability information with the luminal structure. The analyzability information is information for identifying at least one of the analyzable region and the unanalyzable region in the captured image. FIG. 22 illustrates an elliptical analyzable region A2 and an elliptical unanalyzable region A1. Each of these regions is a polygon defined by, for example, three or more feature points. In the luminal structure information, which is a set of a plurality of feature points with identified three-dimensional positions, the association processing section 38 identifies a closed region surrounded by the feature points that define the analyzable region as the analyzable portion. For example, the portion corresponding to the analyzable region A2 is determined to be an analyzable portion A4. Then, the association processing section 38 identifies the region, which was not identified as an analyzable portion of the luminal structure, as an unanalyzable portion.

In addition to the identification of the analyzable portion, the association processing section 38 may also identify, in the luminal structure information, a closed region surrounded by the feature points that define the unanalyzable region as the unanalyzable portion. For example, a portion of the lumen corresponding to the unanalyzable region A1 is determined to be an unanalyzable portion A3. In this case, a given portion of the luminal structure determined to be an unanalyzable portion based on the first captured image may be determined to be an analyzable portion based on the second captured image. When an analyzable portion and an unanalyzable portion overlap in this way, the overlapping portion is determined to be an analyzable portion. This is because, if the portion is determined to be analyzable based on at least one captured image, the analysis can be performed with sufficient accuracy with that captured image.

The image processing device 3 outputs the association results. For example, the image processing device 3 performs a process of displaying the luminal structure information, in which the analyzable portion and the unanalyzable portions are displayed in different forms, in the display section, such as the monitor 6, or the like. For example, the unanalyzable portion may be displayed in a different color than the analyzable portion, or may contain animation, such as flashing. A3, A5, A6, and A7 in FIG. 22 are unanalyzable portions, and these unanalyzable portions are displayed in a different color than the analyzable portion such as A4. Further, it is also possible to perform display processing to improve visibility of the unanalyzable portions by displaying text or objects such as arrows.

When the unanalyzable portion is further divided into the first to third unanalyzable portions described above, the association processing section 38 identifies the unanalyzable portion by associating the luminal structure information with the unanalyzable region in the captured image. Specifically, the first unanalyzable portion is the portion associated with the first unanalyzable region, and the second unanalyzable portion is the portion associated with the second unanalyzable region. The third unanalyzable portion can be detected based on the lack of the luminal structure information, as described above. If the first and second unanalyzable portions overlap, the association processing section 38 may determine the final association result based on the size, shape, and the like of each unanalyzable portion. In this case, the image processing device 3 performs a process of displaying the analyzable portion, the first unanalyzable portion, the second unanalyzable portion, and the third unanalyzable portion in different forms in the monitor 6, or the like.

The process shown in FIG. 22 allows association of the analyzability information with the luminal structure information. In addition, the image processing device 3 may detect, in the unanalyzable portion, a missed portion of the insertion section 2b that needs to be reinserted distally into the lumen.

Figure 23A:
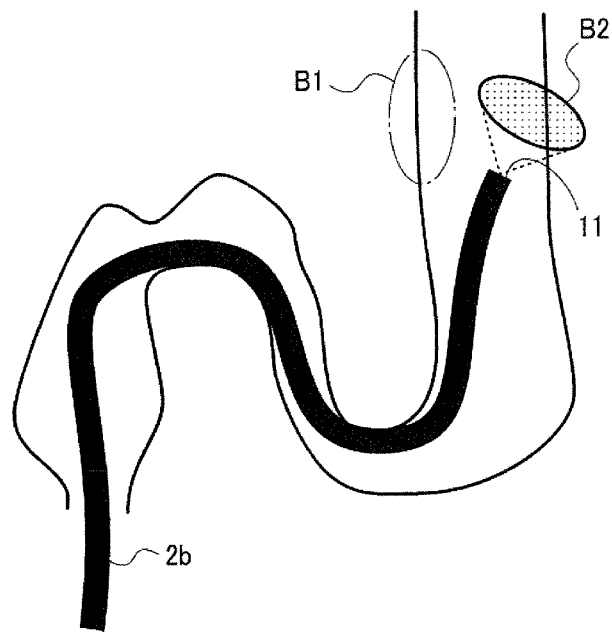
FIGS. 23A and 23B illustrate positional relationship between the distal end section and an unanalyzable portion.
Figure 23B:
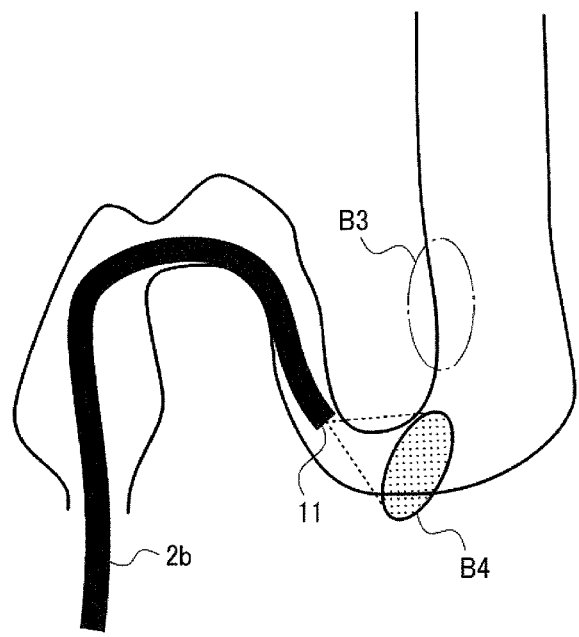

FIG. 23A and FIG. 23B illustrate the positional relationship between the distal end section 11 of the endoscope 2 and the unanalyzable portion. In FIG. 23A and FIG. 23B, B1 and B3 represent unanalyzable portions, and B2 and B4 represent the field of view of the imaging section. The observation of the intestinal tract using the endoscope system 1 is performed by inserting the insertion section 2b to the innermost part and then proximally withdrawing the insertion section 2b. The innermost part is, for example, near the cecum, and the proximal side is the anal side. Even if there is an unanalyzable portion, an image of the unanalyzable portion can be captured with a relatively simple operation if the unanalyzable portion is located in the vicinity of the distal end section 11 as shown in FIG. 23A. An operation herein refers to, for example, an operation of changing the orientation of the curving section 12 or an operation of slightly pushing the insertion section 2b.

In contrast, in FIG. 23B, there is an unanalyzable portion beyond the bend section. The bend section is, for example, an SD junction. In order to observe the unanalyzable portion deeper than the bend section, an operation of sending it beyond the bend section and the folds is required.

The missed portion determination section 39 of the present embodiment does not determine the unanalyzable portion shown in FIG. 23A to be a missed portion, but determines the unanalyzable portion shown in FIG. 23B to be a missed portion. If the unanalyzable portion is located in more proximal side than the current position of the distal end section 11, there is a high probability that it can be observed in subsequent scans. Therefore, the missed portion determination section 39 does not determine the unanalyzable portion located in more proximal side than the current position to be a missed portion. In this way, it is possible to determine the unanalyzable portions that have a high probability of not being observable unless the user performs a certain operation to be a missed portion.

For example, if there is an unanalyzable portion, the missed portion determination section 39 determines whether or not the unanalyzable portion is located more distal end side of the intestinal tract than the current position of the distal end section 11 by performing a process of comparing the position of the unanalyzable portion and the current position of the distal end section 11. For example, the missed portion determination section 39 determines the distal end direction and the proximal end direction based on the time-series position information obtained by the calculation process of the luminal structure information. The position information herein may be information acquired by the position/orientation detection sensor, such as the magnetic sensor 16, or may be a parameter that is optimized using SLAM or SfM. A sensor related to the amount of change in the position and orientation, such as a gyro sensor for detecting acceleration, may also be used as the position/orientation detection sensor, since such a sensor is capable of determining the position and orientation by appropriately repeating the time integration of the detection results. As mentioned above, the observation starts at the innermost part of the lumen, and the distal end section 11 thereafter moves toward the proximal end direction. Alternatively, if the magnetic sensor 16 or the like may be used, the distal end direction and the proximal end direction may be determined based on the position and orientation information acquired upon the distal insertion. The travelling direction upon the insertion is the distal end direction.

If the unanalyzable portion is located more distal end side than the distal end section 11, the missed portion determination section 39 determines whether or not an image of the unanalyzable portion can be captured by an operation of the curving section 12. The current position and orientation of the curving section 12 is known, for example, based on the control data of the left/right curving operation knob 14a and the up/down curving operation knob 14b. Further, the maximum curving angle etc. of the curving section 12 is also known from the design. Such known information allows the association processing section 38 to determine whether or not the image of the unanalyzable portion can be captured by an operation of the curving section 12.

The missed portion determination section 39 determines the unanalyzable portion that is located more distal end side than the distal end section 11 and that cannot be imaged only by the operation of the curving section 12 to be a missed portion. Also, as mentioned above, it is relatively easy to perform a pushing operation in a short distance without going beyond the bend section. Therefore, the missed portion determination section 39 may determine whether or not the unanalyzable portion is a missed portion based not only on whether the unanalyzable portion is located more distal end side than the distal end section 11, but also on the distance between the distal end section 11 and the unanalyzable portion, the presence or absence of the bend section, and the like.

As described above, the endoscope system 1 may include the association processing section 38 that associates the analyzability information with the luminal structure based on the analyzability information and the luminal structure information. The association processing section 38 determines the portion of the luminal structure that is determined to be analyzable based on at least one captured image as the analyzable portion, and determines the portions of the luminal structure other than the analyzable portion as the unanalyzable portion(s).

According to the method of the present embodiment, it is possible to associate the determination as to whether or not the image of the lumen has been captured in a state allowing the desired analysis, such as the lesion detection or malignancy determination, with the structure of the lumen. Thus, it is possible to appropriately determine which region of the luminal structure is likely to have a missed portion. This allows the re-scanning described above to be appropriately performed. Alternatively, the endoscope system 1 may present the association results to the user who is performing the observation.

The endoscope system 1 may also determine the unanalyzable portion that is determined to be unobservable without distally inserting the insertion section 2b into the lumen to be a missed portion. In this way, it is possible to identify portions where missed portions are more likely to exist. For example, it becomes possible to determine, with high accuracy, whether or not the re-scanning is necessary, and if so, whether or not the reinsertion of the insertion section 2b is necessary. It also becomes possible to presume how the insertion section 2*b* should be moved when the insertion section 2*b* is reinserted.

The control section 33 may control the turning mechanism 18 and the advancing/retreating mechanism 17 so that the missed portion comes in the field of view of the imaging section. In this way, the re-scanning, more narrowly, the re-scanning accompanied by the reinsertion of the insertion section 2*b* can be automatically performed, thus reducing the burden on the physicians, etc. However, the control unit 33 may present information for capturing an image of the missed portion to the user and leave the specific operation for performing the reinsertion to the user.

In the case where the lumen is observed by distally inserting the insertion section 2*b* into the lumen and then proximally withdrawing the insertion section 2*b*, the control section 33 may perform the control of the turning mechanism 18 and the advancing/retreating mechanism 17 to enable the scanning of the inner wall of the lumen to be performed in the field of view of the imaging section, as well as the control to identify the analyzable portion. It becomes possible to perform the scanning and each control in the association in a state in which the image of the inner wall of the lumen can be easily captured.

Although the embodiments to which the present disclosure is applied and the modifications thereof have been described in detail above, the present disclosure is not limited to the embodiments and the modifications thereof, and various modifications and variations in components may be made in implementation without departing from the spirit and scope of the present disclosure. The plurality of elements disclosed in the embodiments and the modifications described above may be combined as appropriate to implement the present disclosure in various ways. For example, some of all the elements described in the embodiments and the modifications may be deleted. Furthermore, elements in different embodiments and modifications may be combined as appropriate. Thus, various modifications and applications can be made without departing from the spirit and scope of the present disclosure. Any term cited with a different term having a broader meaning or the same meaning at least once in the specification and the drawings can be replaced by the different term in any place in the specification and the drawings.

What is claimed is:

1. An endoscope system comprising:
   an insertion body configured to be inserted into a lumen;
   an objective optical system provided in the insertion body;
   an image sensor configured to acquire a plurality of captured images within a field of view;
   a turning actuator for rotating at least a portion of a distal end of the insertion body having the objective optical system around a reference axis of the insertion body;
   an advancing/retreating actuator for moving the insertion body in a direction along the reference axis; and
   a processor comprising hardware configured to control the turning actuator and the advancing/retreating actuator to control the field of view of the image sensor to scan an inner wall of the lumen along a scanned path and acquire the plurality of captured images along the scanned path based on the field of view;
   wherein the processor is configured to perform the scan by combining movement of the insertion body in a direction along the reference axis by using the advancing/retreating actuator and periodical rotation of the objective optical system in a circumferential direction of the lumen by using the turning actuator; and
   the processor is configured to control the turning actuator and the advancing/retreating actuator such that a first captured image and a second captured image of the plurality of images have overlapping portions, the first captured image being the captured image captured by the image sensor at a given timing, the second captured image being the captured image captured by the image sensor after the first captured image is captured and after the processor is configured to perform a combined control of causing the objective optical system to make substantially one rotation around the reference axis and causing the insertion body to move in the direction along the reference axis by the advancing/retreating actuator.

2. The endoscope system as defined in claim 1, wherein the processor is configured to perform an analysis based on each of the plurality of captured images and control the turning actuator and the advancing/retreating actuator such that the inner wall of the lumen is scanned by a portion of the field of view of the image sensor.

3. The endoscope system as defined in claim 2, wherein the processor is configured to perform, upon detection of a region of interest based on the plurality of captured images, at least one of a process of storing information about the region of interest and a process of presenting the information about the region of interest to a user.

4. The endoscope system as defined in claim 2, wherein upon determination that a portion of the lumen subjected to the scan includes a portion where the analysis is impossible, the processor is configured to perform a re-scan and perform a control to change scanning conditions.

5. The endoscope system as defined in claim 1, wherein the processor is configured to perform an analysis based on each of the plurality of captured images and controls the turning actuator and the advancing/retreating actuator such that an analyzable region in the first captured image and an analyzable region in the second captured image have overlapping portions, the analyzable region being a region in the plurality of captured images.

6. The endoscope system as defined in claim 1, wherein the processor is configured to perform an analyzability determination based on the plurality of captured images to output analyzability information indicative of whether or not each of the plurality of captured images are in an analyzable state and control the turning actuator and the advancing/retreating actuator based on the analyzability information.

7. The endoscope system as defined in claim 6, wherein the processor is configured to output the analyzability information based on a degree of motion of a subject in each of the plurality of captured images.

8. The endoscope system as defined in claim 6, wherein the processor is configured to output the analyzability information based on an image quality of each of the plurality of captured images.

9. The endoscope system as defined in claim 1, wherein the processor is configured to perform a control of causing the objective optical system to move helically using rotation provided by the turning actuator and movement provided by the advancing/retreating actuator, or perform a control of alternately causing rotation provided by the turning actuator and movement provided by the advancing/retreating actuator.

10. The endoscope system as defined in claim 1, wherein when controlling of the turning actuator and the advancing/retreating actuator to scan the inner wall of the lumen by the field of view of the image sensor, the processor is configured to perform, as a control to maintain a state of the lumen, at least one of a control of injecting gas into the lumen and releasing gas from the lumen and a control of adjusting a body position of a subject.

11. The endoscope system as defined in claim 1, wherein upon determination that a portion of the lumen subjected to the scan includes a portion that is not in the field of view of the image sensor, the processor is configured to perform a re-scan and perform a control to change scanning conditions.

12. The endoscope system as defined in claim 11, wherein the processor is configured to perform, as the control to change the scanning conditions, at least one of:
    a control of injecting gas into the lumen and releasing gas from the lumen;
    a control of removing an obstacle inside the lumen; and
    a control of changing motion of the field of view using at least one of the turning actuator and the advancing/retreating actuator.

13. The endoscope system as defined in claim 1, wherein the processor is configured to perform:
    a luminal structure information acquisition process of obtaining luminal structure information based on each of the plurality of captured images, the luminal structure information being indicative of a structure of the lumen;
    an analyzability determination to output analyzability information based on each of the plurality of captured images, the analyzability information being indicative of whether or not each of the plurality of captured images are in an analyzable state; and
    an association process of associating the analyzability information with the structure of the lumen based on the analyzability information and the luminal structure information, and
    the processor is configured to identify an analyzable portion and an unanalyzable portion in the structure of the lumen, the analyzable portion being a region that is determined to be analyzable based on at least one captured image of the plurality of captured images, the unanalyzable portion being a portion other than the analyzable portion.

14. The endoscope system as defined in claim 13, wherein the processor is configured to perform a position and orientation detection process of acquiring position and orientation information about a position and orientation of the objective optical system with respect to the lumen, from a position sensor provided at a distal end of the insertion body inserted into the lumen, and
    the processor is configured to obtain the luminal structure information based on the position and orientation information and the captured image.

15. The endoscope system as defined in claim 13, wherein the processor is configured to perform a missed portion determination to determine, as a missed portion, the unanalyzable portion that is determined to be unobservable unless the insertion body is inserted distally into the lumen.

16. The endoscope system as defined in claim 1, wherein in a case of observing the lumen by inserting the insertion body distally into the lumen and then proximally withdrawing the insertion body, the processer is configured to control the turning actuator and the advancing/retreating actuator at least when the insertion body is proximally withdrawn.

17. A method of scanning a lumen using an endoscope system, the method comprising:
    inserting an insertion body of an endoscope system into a lumen, the endoscope system including: the insertion body; an objective optical system provided in the insertion body; and an image sensor configured to acquire a plurality of captured images within a field of view; and
    performing a turning operation and an advancing/retreating operation to scan an inner wall of the lumen along a scanned path and capture the plurality of images along the scanned path based on the field of view, the turning operation causing at least a portion of a distal end of the insertion body having the objective optical system to rotate around a reference axis of the insertion body, the advancing/retreating operation causing the insertion body to move in a direction along the reference axis;
    wherein the scan is performed by combining movement of the insertion body in a direction along the reference axis by the advancing/retreating operation and periodical rotation of the objective optical system in a circumferential direction of the lumen by the turning operation; and
    the turning operation and the advancing/retreating operation are performed such that a first captured image and a second captured image of the plurality of images have overlapping portions, the first captured image being the captured image captured by the image sensor at a given timing, the second captured image being the captured image captured by the image sensor after the first captured image is captured and performing a combined control of causing the objective optical system to make substantially one rotation around the reference axis and causing the insertion body to move in the direction along the reference axis by the advancing/retreating operation.

* * * * *